(12) United States Patent
Tanaka

(10) Patent No.: US 9,400,372 B2
(45) Date of Patent: Jul. 26, 2016

(54) IMAGING LENS AND IMAGING APPARATUS EQUIPPED WITH THE IMAGING LENS

(71) Applicant: FUJIFILM Corporation, Tokyo (JP)

(72) Inventor: Takuya Tanaka, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/591,050

(22) Filed: Jan. 7, 2015

(65) Prior Publication Data

US 2015/0198788 A1   Jul. 16, 2015

(30) Foreign Application Priority Data

Jan. 10, 2014   (JP) .................................. 003429/2014

(51) Int. Cl.
*G02B 3/02* (2006.01)
*G02B 13/00* (2006.01)

(52) U.S. Cl.
CPC .................................. *G02B 13/0045* (2013.01)

(58) Field of Classification Search
CPC ............. G02B 13/18; G02B 9/60; G02B 3/04
USPC .................................................. 359/708, 714
See application file for complete search history.

(56) References Cited

U.S. PATENT DOCUMENTS

| 8,179,614 | B1 | 5/2012 | Tsai |
| 8,693,108 | B2 | 4/2014 | Liao et al. |
| 8,717,688 | B2 | 5/2014 | Chou |
| 2010/0134904 | A1* | 6/2010 | Tsai ............................. 359/764 |
| 2010/0253829 | A1* | 10/2010 | Shinohara .................... 348/340 |

FOREIGN PATENT DOCUMENTS

| CN | 202815300 | 3/2013 |
| TW | 201305652 | 2/2013 |

* cited by examiner

*Primary Examiner* — James Greece
(74) *Attorney, Agent, or Firm* — Young & Thompson

(57) ABSTRACT

An imaging lens is substantially constituted by five lenses, including: a positive first lens having a convex surface toward the object side; a negative second lens of a meniscus shape with a concave surface toward the object side; a positive third lens of a meniscus shape with a convex surface toward the object side; a positive fourth lens of a meniscus shape with a concave surface toward the object side; and a negative fifth lens having a concave surface toward the image side, the surface thereof toward the image side being of an aspherical shape having at least one inflection point within a range from an intersection of a principal light ray at a maximum angle of view with the surface toward the image side inwardly toward the optical axis in the radial direction, provided in this order from the object side. The imaging lens satisfies a predetermined conditional formula.

18 Claims, 14 Drawing Sheets

EXAMPLE 3

IMAGING LENS AND IMAGING APPARATUS EQUIPPED WITH THE IMAGING LENS

CROSS REFERENCE TO RELATED APPLICATIONS

The present application claims priority under 35 U.S.C. §119 to Japanese Patent Application No. 2014-003429 filed on Jan. 10, 2014. The above application is hereby expressly incorporated by reference, in its entirety, into the present application.

BACKGROUND OF THE INVENTION

1. Technical Field

The present invention is related to a fixed focus imaging lens for forming optical images of subjects onto an imaging element such as a CCD (Charge Coupled Device) and a CMOS (Complementary Metal Oxide Semiconductor). The present invention is also related to an imaging apparatus provided with the imaging lens that performs photography such as a digital still camera, a cellular telephone with a built in camera, a PDA (Personal Digital Assistant), a smart phone, a tablet type terminal, and a portable gaming device.

2. Background Art

Accompanying the recent spread of personal computers in households, digital still cameras capable of inputting image data such as photographed scenes and portraits into personal computers are rapidly becoming available. In addition, many cellular telephones, smart phones, and tablet type terminals are being equipped with camera modules for inputting images. Imaging elements such as CCD's and CMOS's are employed in these devices having photography functions. Recently, miniaturization of these imaging elements is advancing, and there is demand for miniaturization of the entirety of the photography devices as well as imaging lenses to be mounted thereon. At the same time, the number of pixels in imaging elements is increasing, and there is demand for high resolution and high performance of imaging lenses. Performance corresponding to 5 megapixels or greater, and more preferably 8 megapixels or greater, is desired.

In response to such demands, imaging lenses having a five lens configuration, which is a comparatively large number of lenses, have been proposed. For example, Chinese Utility Model Publication No. 202815300, Taiwanese Patent Publication No. 201305652, and U.S. Pat. No. 8,179,614 propose imaging lenses with five lens configurations, constituted by: a first lens having a positive refractive power, a second lens having a negative refractive power, a third lens having a positive refractive power, a fourth lens having a positive refractive power, and a fifth lens having a negative refractive power, provided in this order from the object side.

DISCLOSURE OF THE INVENTION

Meanwhile, the image sizes of imaging elements are increasing accompanying the demand for a greater number of pixels, with respect to imaging lenses for use in apparatuses which are becoming thinner such as smart phones and tablet terminals. There is increased demand for the total lengths of lenses to be shortened further with respect to the image sizes of imaging elements having large image sizes that satisfy the demand for a greater number of pixels. In addition to the demand for increased resolution, there is demand for imaging lenses having smaller F numbers and wider angles of view. However, the imaging lenses disclosed in Chinese Utility Model Publication No. 202815300, Taiwanese Patent Publication No. 201305652, and U.S. Pat. No. 8,179,614 are not favorably, because the total lengths of these lenses will become excessively long if applied to imaging elements that satisfy the demand for a greater number of pixels. Further, greater angles of view and smaller F numbers are desired for the imaging lenses disclosed in Chinese Utility Model Publication No. 202815300, Taiwanese Patent Publication No. 201305652, and U.S. Pat. No. 8,179,614.

The present invention has been developed in view of the foregoing points. The object of the present invention is to provide an imaging lens that can realize a shortening of the total length with respect to image sizes so as to be compatible with large imaging elements having a greater numbers of pixels, a wide angle of view, a small F number, and high imaging performance from a central angle of view to peripheral angles of view. It is another object of the present invention to provide an imaging apparatus equipped with the lens, which is capable of obtaining high resolution photographed images.

A first imaging lens of the present invention substantially consists of five lenses, including:

a first lens having a positive refractive power and a convex surface toward the object side;

a second lens having a negative refractive power and is of a meniscus shape with a concave surface toward the object side;

a third lens having a positive refractive power and is of a meniscus shape with a convex surface toward the object side;

a fourth lens having a positive refractive power and is of a meniscus shape with a concave surface toward the object side; and a fifth lens having a negative refractive power and is of an meniscus shape having a convex surface toward the object side, the surface thereof toward the image side being of an aspherical shape having at least one inflection point within a range from an intersection of a principal light ray at a maximum angle of view with the surface toward the image side inwardly toward the optical axis in the radial direction, provided in this order from the object side;

the imaging lens satisfying the following conditional formula:

$$1.29 < f/f1 < 3 \tag{1}$$

wherein f is the focal length of the entire system, and f1 is the focal length of the first lens.

A second imaging lens of the present invention substantially consists of five lenses, including:

a first lens having a positive refractive power and a convex surface toward the object side;

a second lens having a negative refractive power and is of a meniscus shape with a concave surface toward the object side;

a third lens having a positive refractive power and is of a meniscus shape with a convex surface toward the object side;

a fourth lens having a positive refractive power and is of a meniscus shape with a concave surface toward the object side; and a fifth lens having a negative refractive power and a concave surface toward the image side, the surface thereof toward the image side being of an aspherical shape having at least one inflection point within a range from an intersection of a principal light ray at a maximum angle of view with the surface toward the image side inwardly toward the optical axis in the radial direction, provided in this order from the object side;

the imaging lens satisfying the following conditional formula:

$$1.26 < TTL/(f \tan \omega) < 1.46 \tag{2}$$

wherein TTL is the distance from the surface of the first lens toward the object side to the imaging surface along the optical axis in the case that back focus is an air converted length, f is the focal length of the entire system, and t is the half value of a maximum angle of view when focused on an object at infinity.

The optical performance of the first and second imaging lenses of the present invention can be further improved by adopting the following favorable configurations.

In the first and second imaging lenses of the present invention, it is preferable for the first lens to be of a biconvex shape.

In the first and second imaging lenses of the present invention, it is preferable for the surface of the second lens toward the object side to be of an aspherical shape having at least one inflection point within a range from an intersection of a marginal axial light ray with the surface toward the object side inwardly toward the optical axis in the radial direction.

In the first and second imaging lenses of the present invention, it is preferable for the surface of the third lens toward the object side to be of an aspherical shape having at least one inflection point within a range from an intersection of a marginal axial light ray with the surface toward the object side inwardly toward the optical axis in the radial direction.

It is preferable for the first and second imaging lenses of the present invention to further comprise an aperture stop positioned at the object side of the surface of the first lens toward the object side.

It is preferable for the first imaging lens of the present invention to satisfy one or arbitrary combinations of Conditional Formulae (3) through (7), (1-1) through (5-1), and (1-2) through (2-2) below. It is preferable for the second imaging lens of the present invention to satisfy one or arbitrary combinations of Conditional Formulae (1), (3) through (7), (1-1) through (5-1), and (1-2) through (2-2) below.

$$1.29 < f/f1 < 3 \tag{1}$$

$$1.32 < f/f1 < 2.5 \tag{1-1}$$

$$1.35 < f/f1 < 2 \tag{1-2}$$

$$1.34 < TTL/(f \cdot \tan \omega) < 1.45 \tag{2-1}$$

$$1.38 < TTL/(f \cdot \tan \omega) < 1.45 \tag{2-2}$$

$$0 < f/f3 < 0.27 \tag{3}$$

$$0 < f/f3 < 0.21 \tag{3-1}$$

$$0 < f/(f3 \cdot vd3) < 0.012 \tag{4}$$

$$0 < f/(f3 \cdot vd3) < 0.004 \tag{4-1}$$

$$0.5 < L1f/\Phi < 0.86 \tag{5}$$

$$0.6 < L1f/\Phi < 0.84 \tag{5-1}$$

$$1 < f \cdot \tan \omega / L5r < 3 \tag{6}$$

$$-1.6 < f/f5 < -1.22 \tag{7}$$

wherein f is the focal length of the entire system, f1 is the focal length of the first lens, f3 is the focal length of the third lens, f5 is the focal length of the fifth lens, vd3 is the Abbe's number of the third lens with respect to the d line, L1f is the paraxial radius of curvature of the surface of the first lens toward the object side, L5r is the paraxial radius of curvature of the surface of the fifth lens toward the image side, Φ is the diameter of the entrance pupil, and TTL is the distance from the surface of the first lens toward the object side to the imaging surface along the optical axis in the case that back focus is an air converted length, f is the focal length of the entire system, and ω is the half value of a maximum angle of view when focused on an object at infinity.

Note that in the first and second imaging lenses of the present invention, the expression "substantially consists of five lenses" means that the imaging lens of the present invention may also include lenses that practically have no power, optical elements other than lenses such as a stop and a cover glass, and mechanical components such as lens flanges, a lens barrel, a camera shake correcting mechanism, etc., in addition to the five lenses.

Note also that the shapes of the surfaces of the lenses and the signs of the refractive indices thereof are considered in the paraxial region in the case that the lenses include aspherical surfaces. The signs of the refractive indices are positive for surfaces having convex surfaces toward the object side, and negative for surfaces having convex surfaces toward the image side.

In addition, the "inflection point" refers to a point at which the shape of a surface changes from a convex shape to a concave shape (or from a concave shape to a convex shape) with respect to the image side.

An imaging apparatus of the present invention is equipped with the imaging lens of the present invention.

According to the imaging lens of the present invention, the configuration of each lens element is optimized within a lens configuration having five lenses as a whole, and the shapes of the first lens through the fifth lens are favorably configured in particular. Therefore, a lens system that can achieve a short total length with respect to image sizes which is compatible with an imaging element of a size that satisfies demand for a greater number of pixels, while achieving a wider angle of view and a small F number, and realizes high imaging performance from a central angle of view to peripheral angles of view can be realized.

The imaging apparatus of the present invention is equipped with the imaging lens of the present invention. Therefore, the apparatus size can be shortened in the direction of the optical axis of the imaging lens, and the imaging apparatus of the present invention is capable of obtaining high resolution photographed images.

BEST MODE FOR CARRYING OUT THE INVENTION

Hereinafter, embodiments of the present invention will be described in detail with reference to the attached drawings.

Figure 1:
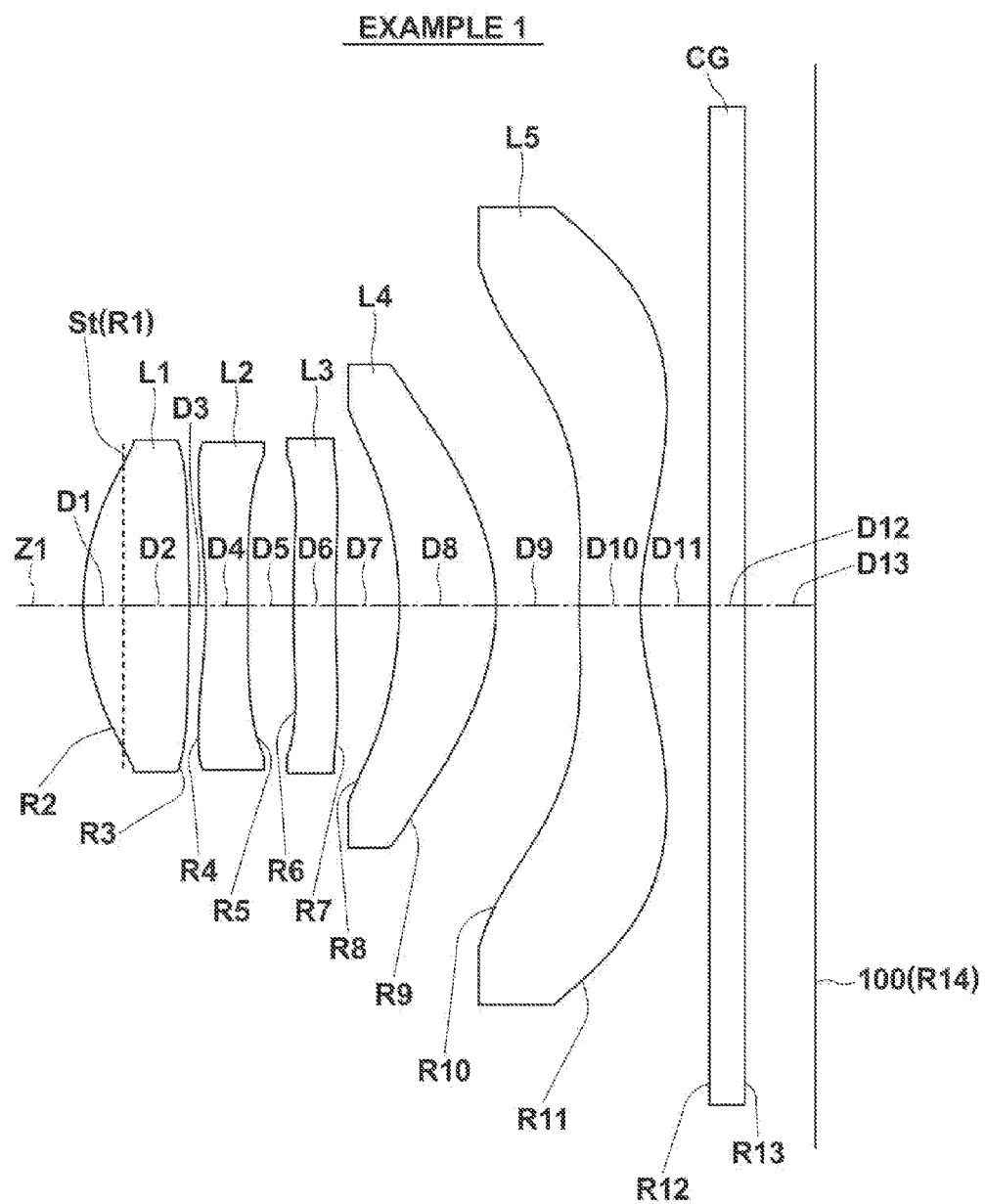
FIG. 1 is a sectional diagram that illustrates a first example of the configuration of an imaging lens according to an embodiment of the present invention, and corresponds to a lens of Example 1.
Figure 2:
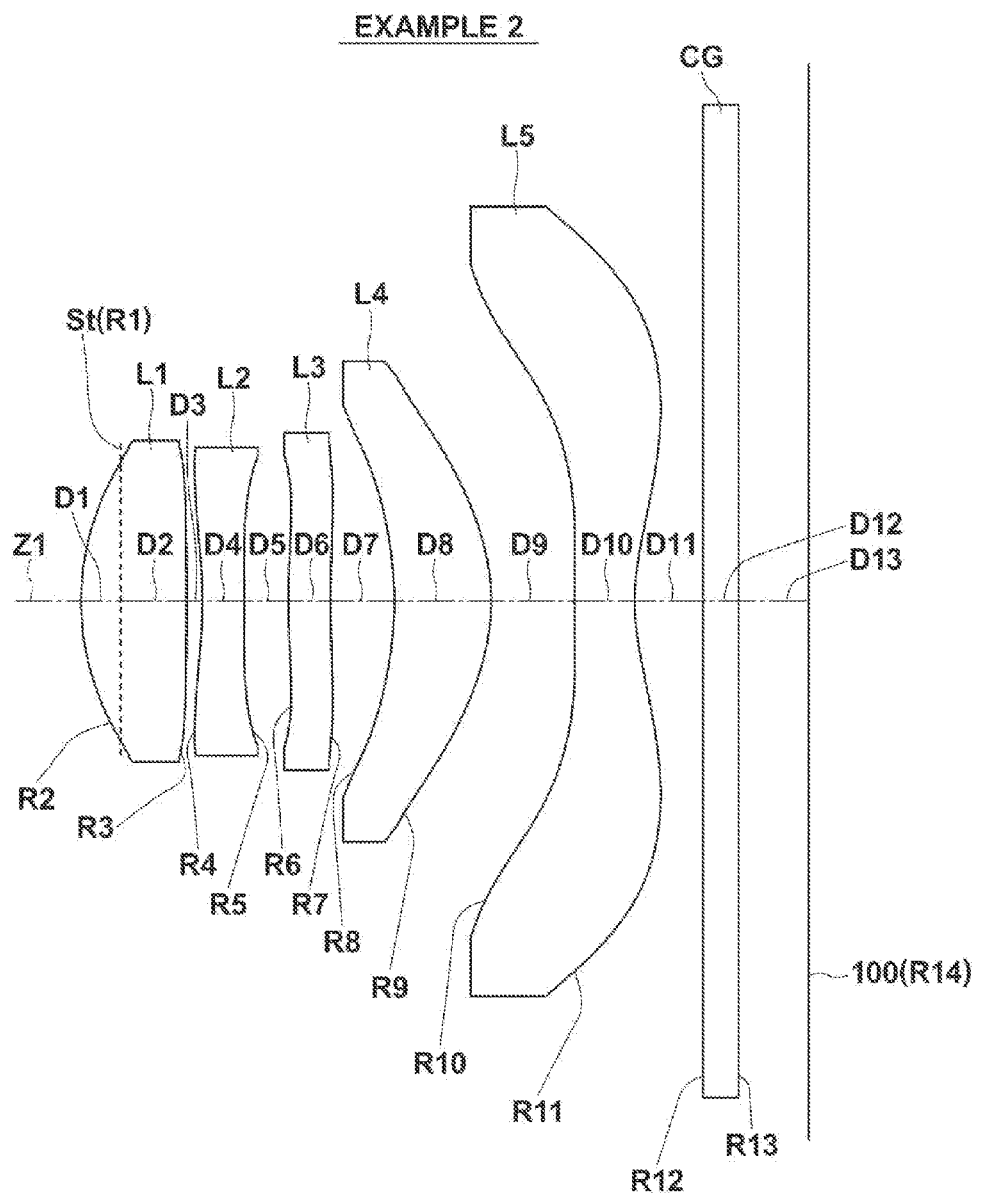
FIG. 2 is a sectional diagram that illustrates a second example of the configuration of an imaging lens according to an embodiment of the present invention, and corresponds to a lens of Example 2.
Figure 3:
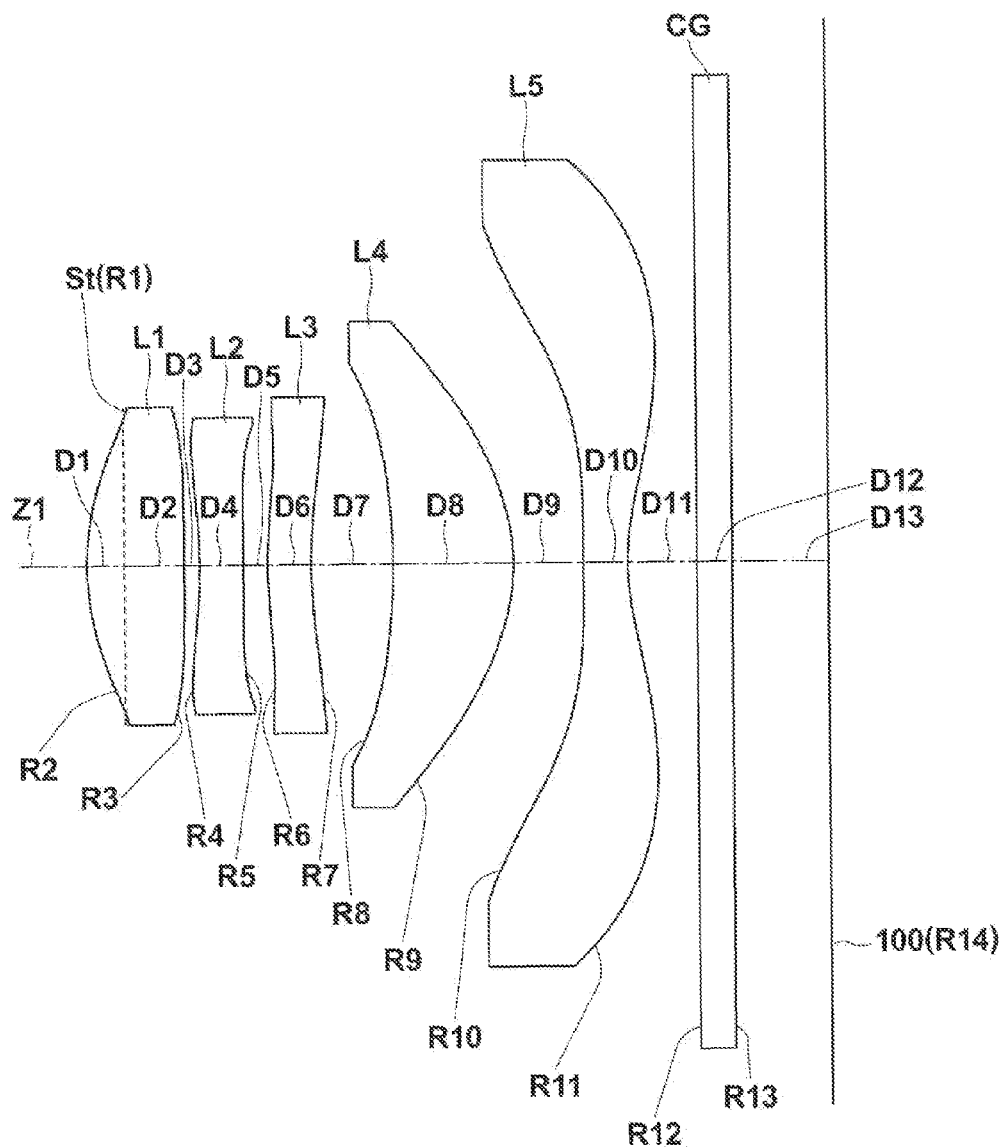
FIG. 3 is a sectional diagram that illustrates a third example of the configuration of an imaging lens according to an embodiment of the present invention, and corresponds to a lens of Example 3.
Figure 4:
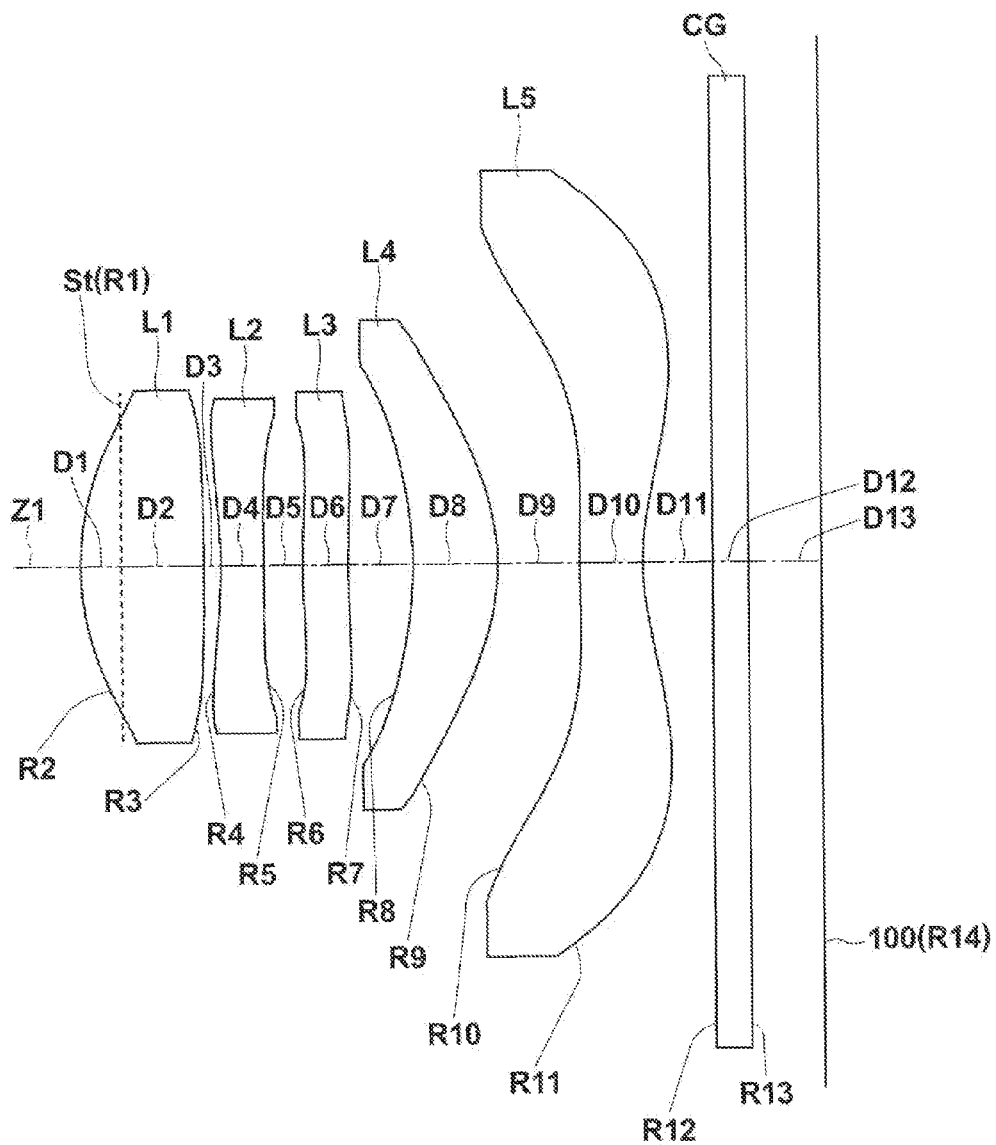
FIG. 4 is a sectional diagram that illustrates a fourth example of the configuration of an imaging lens according to an embodiment of the present invention, and corresponds to a lens of Example 4.
Figure 5:
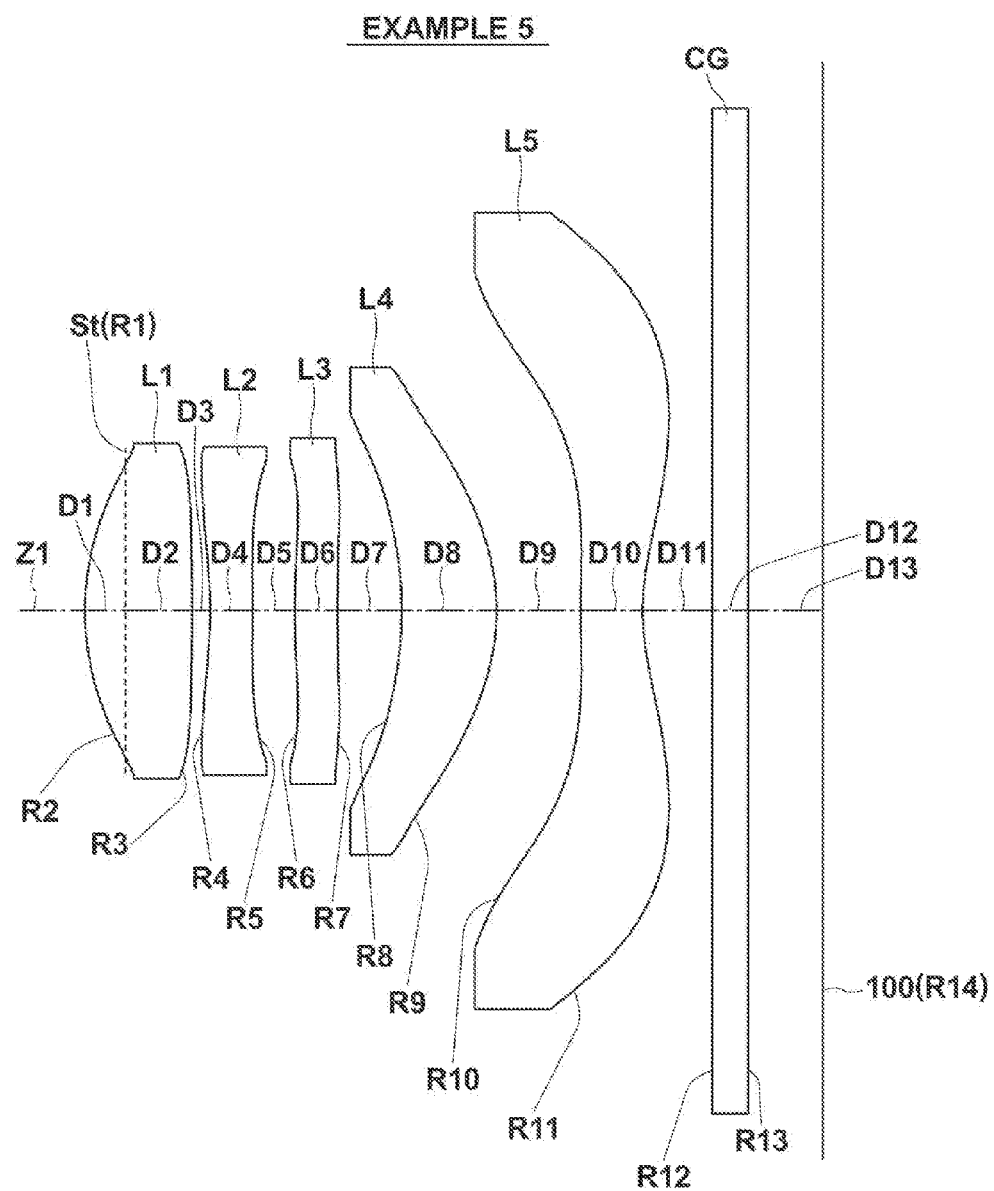
FIG. 5 is a sectional diagram that illustrates a fifth example of the configuration of an imaging lens according to an embodiment of the present invention, and corresponds to a lens of Example 5.
Figure 6:
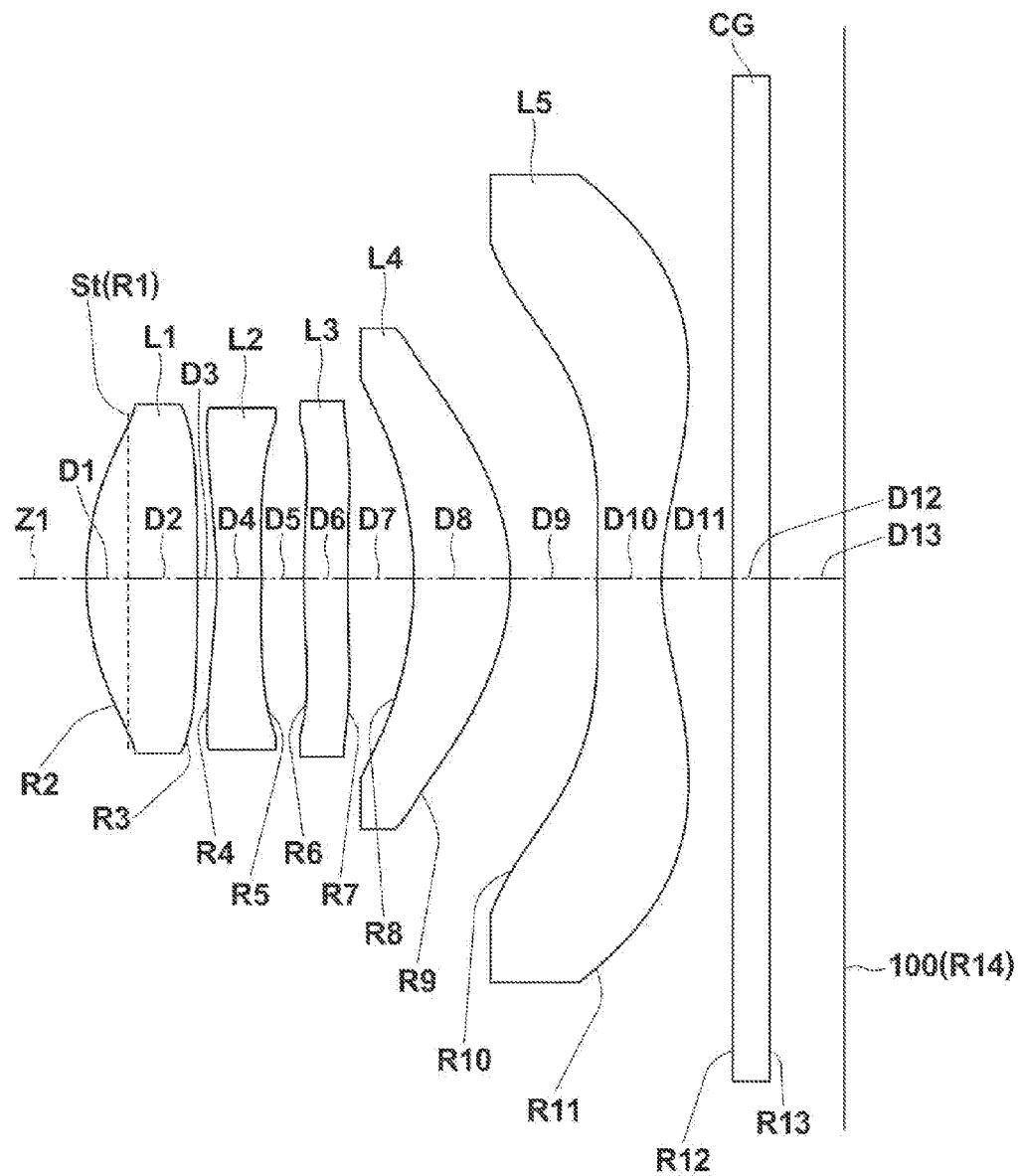
FIG. 6 is a sectional diagram that illustrates a sixth example of the configuration of an imaging lens according to an embodiment of the present invention, and corresponds to a lens of Example 6.
Figure 7:
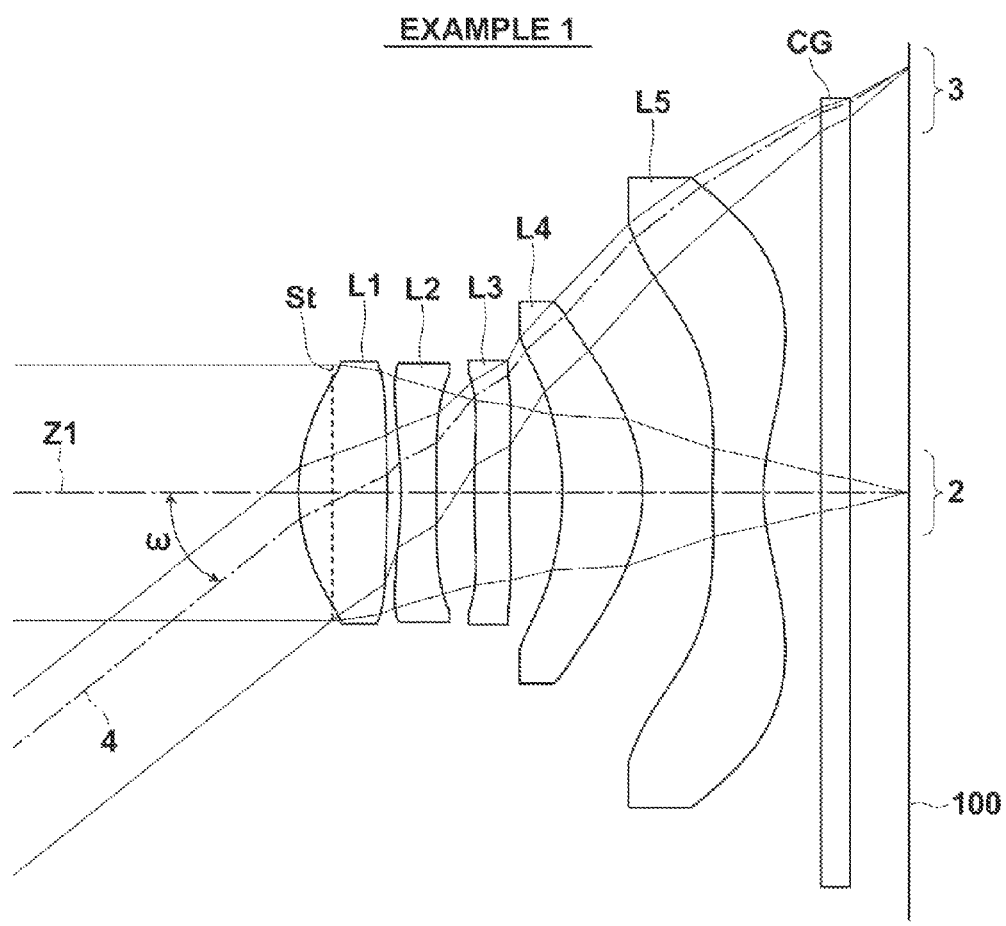
FIG. 7 is a diagram that illustrates the paths of light rays that pass through the imaging lens of FIG. 1.

FIG. 1 illustrates a first example of the configuration of an imaging lens according to an embodiment of the present invention. This example corresponds to the lens configuration of Numerical Example 1 (Table 1 and Table 2), to be described later. Similarly, FIG. 2 through FIG. 6 are sectional diagrams that illustrate second through sixth examples of lens configurations that correspond to Numerical Examples 2 through 6 (Table 3 through Table 12). In FIGS. 1 through 6, the symbol Ri represents the radii of curvature of ith surfaces, i being lens surface numbers that sequentially increase from the object side to the image side, with the surface of a lens element most toward the object side designated as first. The symbol Di represents the distances between an ith surface and an i+1st surface along an optical axis Z1. Note that the basic configurations of the examples are the same, and therefore a description will be given of the imaging lens of FIG. 1 as a base, and the examples of FIGS. 2 through 6 will also be described as necessary. In addition, FIG. 7 is a diagram that illustrates the paths of light rays that pass through the imaging lens of FIG. 1. FIG. 7 illustrates the paths of an axial light beam 2 and a maximum angle of view light beam 3 in a state focused on an object at a distance of infinity, as well as a half value ω of a maximum angle of view. Note that with respect to the maximum angle of view light beam 3, a principal light ray 4 at the maximum angle of view is indicated by a dashed and dotted line.

The imaging lens L of the embodiment of the present invention is favorably employed in various imaging devices that employ imaging elements such as a CCD and a CMOS. The imaging lens L of the embodiment of the present invention is particularly favorable for use in comparatively miniature portable terminal devices, such as a digital still camera, a cellular telephone with a built in camera, a smart phone, a tablet type terminal, and a PDA. The imaging lens L is equipped with a first lens L1, a second lens L2, a third lens L3, a fourth lens L4, and a fifth lens L5, provided in this order from the object side.

Figure 14:
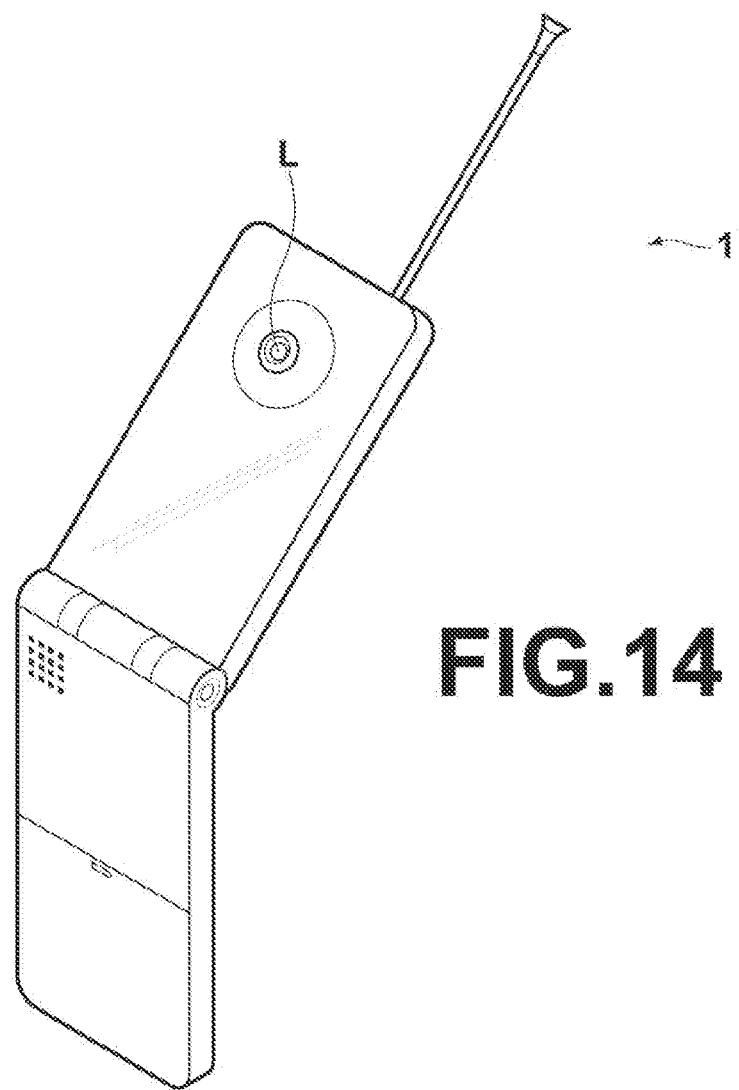
FIG. 14 is a diagram that illustrates a cellular telephone as an imaging apparatus equipped with the imaging lens of the present invention.

FIG. 14 schematically illustrates a cellular telephone as an imaging apparatus 1 according to an embodiment of the present invention. The imaging apparatus 1 of the embodiment of the present invention is equipped with the imaging lens L according to the embodiment of the present invention and an imaging element 100 (refer to FIG. 1 through 6) such as a CCD that outputs image signals corresponding to optical images formed by the imaging lens L. The imaging element 100 is provided at an image formation plane of the imaging lens L.

Figure 15:
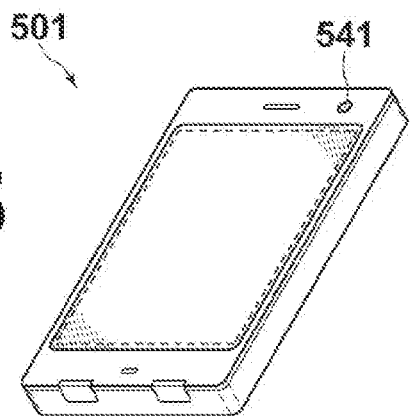
FIG. 15 is a diagram that illustrates a smart phone as an imaging apparatus equipped with the imaging lens of the present invention.

FIG. 15 schematically illustrates a smart phone as an imaging apparatus 501 according to an embodiment of the present invention. The imaging apparatus 501 of the embodiment of the present invention is equipped with a camera section 541 having the imaging lens L according to the embodiment of the present invention and an imaging element 100 (refer to FIGS. 1 through 6) such as a CCD that outputs image signals corresponding to optical images formed by the imaging lens L. The imaging element 100 is provided at an image formation plane of the imaging lens L.

Various optical members CG may be provided between the fifth lens L5 and the imaging element 100, depending on the configuration of the camera to which the lens is applied. A planar optical member such as a cover glass for protecting an imaging surface and an infrared cutoff filter may be provided, for example. In this case, a planar cover glass having a coating having a filtering effect such as an infrared cutoff filter coating or an ND filter coating, or a material that exhibits similar effects, may be utilized as the optical member CG.

Alternatively, the optical member CG may be omitted, and a coating may be administered on the fifth lens L5 to obtain the same effect as that of the optical member CG. In this case, the number of parts can be reduced, and the total length can be shortened.

It is preferable for the imaging lens L to be equipped with an aperture stop St positioned at the object side of the surface of the first lens L1 toward the object side. By positioning the aperture stop St at the object side of the surface of the first lens L1 toward the object side, increases in the incident angles of light rays that pass through the optical system and enter the image formation plane (imaging element) can be suppressed, particularly at the peripheral portions of an imaging region. Note that the expression "positioned at the object side of the surface of the first lens L1 toward the object side" means that the position of the aperture stop in the direction of the optical axis is at the same position as the intersection of marginal axial rays of light and the surface of the first lens L1 toward the object side, or more toward the object side than this position.

Further, in the case that the aperture stop St is positioned at the object side of the surface of the first lens L1 toward the object side in the direction of the optical axis, it is preferable for the aperture stop St to be positioned at the image side of the apex of the surface of the first lens L1 toward the object side. In the case that the aperture stop St is positioned at the image side of the apex of the surface of the first lens L1 toward the object side in this manner, the total length of the imaging lens including the aperture stop St can be shortened. Note that the imaging lenses L of Examples 1 through 6 are examples of configurations in which the aperture stop St is positioned at the object side of the surface of the first lens L1 toward the object side, and positioned at the image side of the apex of the surface of the first lens L1 toward the object side. Alternatively, the aperture stop St may be positioned at the object side of the apex of the surface of the first lens L1 toward the object side. A case in which the aperture stop St is positioned at the object side of the apex of the surface of the first lens L1 toward the object side is somewhat disadvantageous from the viewpoint of securing peripheral light compared to a case in which the aperture stop St is positioned at the image side of the apex of the surface of the first lens L toward the object side. However, increases in the incident angles of light rays at peripheral portions of an imaging region that enter the image formation plane (imaging element) can be more favorably suppressed. Note that the aperture stops St illustrated in FIG. 1 through FIG. 6 do not necessarily represent the sizes or shapes thereof, but indicate the positions thereof on the optical axis Z1.

In the imaging lens L, the first lens L1 has a positive refractive power in the vicinity of the optical axis. This configuration is advantageous from the viewpoint of shortening the total length of the lens. In addition, the first lens L1 has a convex surface toward the object side in the vicinity of the optical axis. Thereby, the positive refractive power of the first lens L1, which performs a substantial portion of the image forming function, can be sufficiently increased. As a result, shortening of the total length of the lens can be more favorably realized. In addition, it is preferable for the first lens L1 to be of a biconvex shape in the vicinity of the optical axis. In this case, the second lens L2, which has a concave surface toward the object side in the vicinity of the optical axis, can be provided adjacent to the first lens L1, which is of a biconvex shape in the vicinity of the optical axis, at the image side thereof, and spherical aberration can be favorably corrected.

The second lens L2 has a negative refractive power in the vicinity of the optical axis. In addition, the second lens L2 is of a meniscus shape having a concave surface toward the object side in the vicinity of the optical axis. Thereby, spherical aberration and chromatic aberration can be favorably corrected.

In addition, it is preferable for the surface of the second lens L2 toward the object side to be of an aspherical shape having at least one inflection point within a range from an intersection of a marginal axial light ray with the surface toward the object side inwardly toward the optical axis in the radial direction. In this case, the surface of the second lens L2 toward the object side can be configured to be convex toward the object side at the peripheral portions thereof, and the generation of higher order spherical aberration can be favorably suppressed. Note that in the present specification, the expression "within a range from an intersection of a marginal axial light ray with the surface toward the object side inwardly toward the optical axis in the radial direction" refers to a position at the intersection of the surface toward the object side and the axial marginal light ray and positions along the radial direction toward the optical axis therefrom. The inflection point may be provided on the surface of the second lens L2 toward the object side at any arbitrary position from among the position at the intersection of the surface toward the object side and the axial marginal light ray and positions along the radial direction toward the optical axis therefrom.

The third lens L3 has a positive refractive power in the vicinity of the optical axis. This configuration is advantageous from the viewpoint of shortening the total length, and also facilitates correction of spherical aberration. In addition, the third lens L3 is of a meniscus shape having a concave surface toward the object side in the vicinity of the optical axis. Thereby, the rearward principal point of the third lens L3 can be moved toward the object side, and the total length of the lens can be favorably shortened.

In addition, it is preferable for the surface of the third lens L3 toward the object side to be of an aspherical shape having at least one inflection point within a range from an intersection of a marginal axial light ray with the surface toward the object side inwardly toward the optical axis in the radial direction. In this case, the surface of the third lens L3 toward the object side can be configured to be concave toward the object side at the peripheral portions thereof, and the generation of astigmatism at large angles of view can be favorably suppressed. The inflection point may be provided on the surface of the third lens L3 toward the object side at any arbitrary position from among the position at the intersection of the surface toward the object side and the axial marginal light ray and positions along the radial direction toward the optical axis therefrom.

The fourth lens L4 has a positive refractive power in the vicinity of the optical axis. In this case, increases in the incident angles of light rays that pass through the optical system and enter the image formation plane (imaging element) can be suppressed, particularly at intermediate angles of view. In addition, the fourth lens L4 is of a meniscus shape having a concave surface toward the object side in the vicinity of the optical axis. Thereby, astigmatism can be favorably corrected.

The fifth lens L5 has a negative refractive power in the vicinity of the optical axis. Thereby, shortening of the total length of the lens can be favorably realized, and field curvature can be favorably corrected. In addition, the fifth lens L5 has a concave surface toward the image side in the vicinity of the optical axis. This configuration is even more advantageous from the viewpoint of correcting field curvature. It is preferable for the fifth lens L5 to be of a meniscus shape having a convex surface toward the object side in the vicinity of the optical axis, in order to cause this advantageous effect to become more prominent.

In addition, the surface of the fifth lens L5 toward the image side is of an aspherical shape having at least one inflection point within a range from an intersection of a principal light ray at a maximum angle of view with the surface toward the image side inwardly toward the optical axis in the radial direction. Thereby, increases in the incident angles of light rays that pass through the optical system and enter the image formation plane (imaging element) can be suppressed, particularly at the peripheral portions of the imaging region. In addition, distortion can be favorably corrected by the surface of the fifth lens L5 toward the image side being of an aspherical shape having at least one inflection point within a range from the intersection of a principal light ray at a maximum angle of view with the surface toward the image side inwardly toward the optical axis in the radial direction. Note that in the present specification, the expression "within a range from an intersection of a principal light ray at a maximum angle of view with the surface toward the image side inwardly toward the optical axis in the radial direction" refers to a position at the intersection of the surface toward the image side and the principal light ray at the maximum angle of view and positions along the radial direction toward the optical axis therefrom. The inflection point may be provided on the surface of the fifth lens L5 toward the image side at any arbitrary position from among the position at the intersection of the surface toward the image side and the principal light ray at the maximum angle of view and positions along the radial direction toward the optical axis therefrom.

According to the imaging lens L described above, the configurations of each of the first lens L1 through the fifth lens L5 are optimized as lens elements in a lens configuration having a total of five lenses. Therefore, a lens system having a shortened total length with respect to image sizes which is compatible with an imaging element of a size that satisfies demand for a greater number of pixels, that also achieves a wider angle of view and a small F number, and realizes high imaging performance from a central angle of view to peripheral angles of view, can be realized.

It is preferable for at least one of the surfaces of each of the first lens L1 through the fifth lens L5 of the imaging lens L to be an aspherical surface, in order to improve performance.

In addition, it is preferable for each of the first lens L1 through the fifth lens L5 that constitute the imaging lens L to be a single lens, not a cemented lens. If all of the lenses are single lenses, the number of lens surfaces in contact with air will be greater than a case in which some of the lenses are cemented lenses. Therefore, the degree of freedom in the design of each lens will increase. As a result, shortening of the total length and increase in resolution will be facilitated.

Next, the operation and effects of conditional formulae related to the imaging lens L configured as described above will be described in greater detail. Note that it is preferable for the imaging lens L to satisfy any one of the following conditional formulae, or arbitrary combinations of the following conditional formulae. It is preferable for the conditional formulae to be satisfied to be selected as appropriate according to the items required of the imaging lens L.

First, it is preferable for the focal length f1 of the first lens L1 and the focal length f of the entire system to satisfy Conditional Formula (1) below.

$$1.29 < f/f1 < 3 \tag{1}$$

Conditional Formula (1) defines a preferable range of numerical values for the ratio of the focal length f of the entire system with respect to the focal length f1 of the first lens L1. By securing the refractive power of the first lens L1 such that the value of f/f1 is not less than or equal to the lower limit defined in Conditional Formula (1), the positive refractive power of the first lens L1 will not become excessively weak with respect to the refractive power of the entire system. As a result, a shortening of the total length of the lens can be favorably realized. In addition, maintaining the diameter of the entrance pupil to be large and shortening the focal length of the entire system is facilitated by satisfying the lower limit of Conditional Formula (1), which is advantageous from the viewpoints of widening the angle of view and decreasing the F number. By suppressing the refractive power of the first lens L1 such that the value of f/f1 is not greater than or equal to the upper limit defined in Conditional Formula (1), the positive refractive power of the first lens L1 will not become excessively strong with respect to the refractive power of the entire system. As a result, spherical aberration and astigmatism can be favorably corrected. It is preferable for Conditional Formula (1-1) to be satisfied, and more preferable for Conditional Formula (1-2) to be satisfied, in order to cause these advantageous effects to become more prominent.

$$1.32 < f/f1 < 2.5 \tag{1-1}$$

$$1.35 < f/f1 < 2 \tag{1-2}$$

In addition, it is preferable for the distance TTL from the surface of the first lens L1 toward the object side to the imaging surface along the optical axis in the case that back focus is an air converted length and a the paraxial image height (f·tan ω) to satisfy Conditional Formula (2) below.

$$1.26 < TTL/(f \tan \omega) < 1.46 \tag{2}$$

Conditional Formula (2) defines a preferable range of numerical values for the ratio of the distance TTL from the surface of the first lens L1 toward the object side to the imaging surface along the optical axis (total length of the lens) with respect to the paraxial image height (f·tan ω). Note that the back focus (the distance from the apex of the surface of the fifth lens L5 toward the image side to the imaging surface) is an air converted length in the total length of the lens. By securing the distance TTL from the surface of the first lens L1 toward the object side to the imaging surface with respect to the paraxial image height (f·tan ω) such that the value of TTL/(f·tan ω) is not less than or equal to the lower limit defined in Conditional Formula (2), astigmatism can be favorably corrected, and increases in the incident angles of light rays that pass through the optical system and enter the image formation plane (imaging element) can be suppressed By maintaining the distance TTL from the surface of the first lens L1 toward the object side to the imaging surface with respect to the paraxial image height (f·tan ω) such that the value of TTL/(f·tan ω) is not greater than or equal to the upper limit defined in Conditional Formula (2), the total length of the lens with respect to image sizes can be favorably shortened. For this reason, satisfying Conditional Formula (2) is advantageous from the viewpoint of configuring the imaging lens to be compatible with imaging elements that satisfy demand for a greater number of pixels, and from the viewpoint of maintaining an image size while further shortening the total length of the lens. It is preferable for Conditional Formula (2-1) to be satisfied, and more preferable for Conditional Formula (2-2) to be satisfied, in order to cause these advantageous effects to become more prominent.

$$1.34 < TTL/(f \tan \omega) < 1.45 \tag{2-1}$$

$$1.38 < TTL/(f \tan \omega) < 1.45 \tag{2-2}$$

In addition, it is preferable for the focal length f3 of the third lens L3 and the focal length f of the entire system to satisfy Conditional Formula (3) below.

$$0 < f/f3 < 0.27 \tag{3}$$

Conditional Formula (3) defines a preferable range of numerical values for the ratio of the focal length f of the entire system with respect to the focal length f3 of the third lens L3. By securing the refractive power of the third lens L3 such that the value of f/f3 is not less than or equal to the lower limit defined in Conditional Formula (3), the positive refractive power of the third lens L3 will not become excessively weak with respect to the refractive power of the entire system. This configuration is advantageous from the viewpoint of realizing a shortening of the total length of the lens and a wider angle of view. By suppressing the refractive power of the third lens L3 such that the value of f/f3 is not greater than or equal to the upper limit defined in Conditional Formula (3), the positive refractive power of the third lens L3 will not become excessively strong with respect to the refractive power of the entire system. As a result, spherical aberration can be favorably corrected. It is more preferable for Conditional Formula (3-1) to be satisfied in order to cause these advantageous effects to become more prominent.

$$0<f/f3<0.21 \tag{3-1}$$

In addition, it is preferable for the focal length f of the entire system, the focal length f3 of the third lens L3, and the Abbe's number νd3 of the third lens with respect to the d line to satisfy Conditional Formula (4) below.

$$0<f/(f3\cdot vd3)<0.012 \tag{4}$$

Conditional Formula (4) defines a preferable range of numerical values for the product of the ratio (f/f3) of the refractive power of the third lens L3 with respect to the refractive power of the entire system and the dispersive power (1/νd3) of the material of the third lens L3, and represents the percentage of contribution of the dispersion of the third lens L3 with respect to the refractive power of the entire system. Setting the refractive power of the entire system, the refractive power of the third lens L3, and the dispersive power of the third lens L3 such that the value of f/(f3·νd3) is not less than or equal to the lower limit defined by Conditional Formula (4) is advantageous from the viewpoint of realizing a shortening of the total length of the lens and a wider angle of view. By setting the refractive power of the entire system, the refractive power of the third lens L3, and the dispersive power of the third lens L3 such that the value of f/(f3·νd3) is not greater than or equal to the upper limit defined by Conditional Formula (4), longitudinal chromatic aberration can be favorably corrected. It is more preferable for Conditional Formula (4-1) to be satisfied in order to cause these advantageous effects to become more prominent.

$$0<f/(f3\cdot vd3)<0.004 \tag{4-1}$$

In addition, it is preferable for the paraxial radius of curvature L1f of the surface of the first lens L1 toward the object side and the diameter Φ of the entrance pupil to satisfy Conditional Formula (5) below.

$$0.5<L1f/\Phi<0.86 \tag{5}$$

Conditional Formula (5) defines a preferable range of numerical values for the paraxial radius of curvature L1f of the surface of the first lens L1 toward the object side with respect to the diameter Φ of the entrance pupil. By setting the paraxial radius of curvature L1f of the surface of the first lens L1 toward the object side with respect to the diameter Φ of the entrance pupil such that the value of L1f/Φ is not less than or equal to the lower limit defined in Conditional Formula (5), the absolute value of the paraxial radius of curvature L1f of the surface of the first lens L toward the object side will not become excessively small with respect to the diameter Φ of the entrance pupil, and the generation of spherical aberration can be suppressed. By setting the paraxial radius of curvature L1f of the surface of the first lens L1 toward the object side with respect to the diameter Φ of the entrance pupil such that the value of L1f/Φ is not greater than or equal to the upper limit defined in Conditional Formula (5), the absolute value of the paraxial radius of curvature L1f of the surface of the first lens L1 toward the object side will not become excessively great with respect to the diameter Φ of the entrance pupil. This configuration is advantageous from the viewpoint of shortening the total length of the lens while realizing a small F number. It is more preferable for Conditional Formula (5-1) to be satisfied in order to cause these advantageous effects to become more prominent.

$$0.6<L1f/\Phi<0.84 \tag{5-1}$$

In addition, it is preferable for the focal length f of the entire system, the half value ω of the maximum angle of view in a state focused on an object at infinity, and the paraxial radius of curvature L5r of the surface of the fifth lens L5 toward the image side to satisfy Conditional Formula (6) below.

$$1<f\cdot \tan \omega /L5r<3 \tag{6}$$

Conditional Formula (6) defines a preferable range of numerical values for the ratio of the paraxial image height (f·tan ω) with respect to the paraxial radius of curvature L5r of the surface of the fifth lens L5 toward the image side. By setting the image height (f·tan ω) with respect to the paraxial radius of curvature of the surface of the fifth lens L5 toward the image side such that the value of f·tan ω/L5r is not less than or equal to the lower limit defined in Conditional Formula (6), the absolute value of the paraxial radius of curvature L5r of the surface of the fifth lens L5 toward the image side, which is the surface most toward the image side in the imaging lens, will not become excessively great. As a result, a shortening of the total length of the lens can be realized, while field curvature can be sufficiently corrected. Note that if the fifth lens L5 has a concave surface toward the image side and is of an aspherical shape having at least one inflection point as shown in the imaging lenses L of each of the Examples and the lower limit of Conditional Formula (6) is satisfied, field curvature can be favorably corrected from a central angle of view to peripheral angles of view. This configuration is favorable from the viewpoint of realizing a wider angle of view. By setting the image height (f·tan ω) with respect to the paraxial radius of curvature of the surface of the fifth lens L5 toward the image side such that the value of f·tan ω/L5r is not greater than or equal to the upper limit defined in Conditional Formula (6), the absolute value of the paraxial radius of curvature L5r of the surface of the fifth lens L5 toward the image side, which is the surface most toward the image side in the imaging lens, will not become excessively small. This will result in increases in the incident angles of light rays that pass through the optical system and enter the image formation plane (imaging element) being suppressed, particularly at intermediate angles of view. In addition, excessive correction of field curvature can be suppressed.

It is preferable for the focal length f5 of the fifth lens L5 and the focal length f of the entire system to satisfy Conditional Formula (7) below.

$$1.6<f/f5<-1.22 \tag{7}$$

Conditional Formula (7) defines a preferable range of numerical values for the ratio of the focal length f of the entire system with respect to the focal length f5 of the fifth lens L5. By suppressing the refractive power of the fifth lens L5 such that the value of f/f5 is not less than or equal to the lower limit defined in Conditional Formula (7), the negative refractive power of the fifth lens L5 will not become excessively strong with respect to the refractive power of the entire system. As a result, increases in the incident angles of light rays that pass through the optical system and enter the image formation plane (imaging element) can be suppressed at intermediate angles of view. By securing the refractive power of the fifth lens L5 such that the value of f/f5 is not greater than or equal to the upper limit defined in Conditional Formula (7), the negative refractive power of the fifth lens L5 will not become excessively weak with respect to the refractive power of the entire system. As a result, field curvature can be favorably corrected.

Further improved imaging performance can be realized in the imaging lenses according to the embodiments of the present invention by satisfying the above preferred conditions appropriately. In addition, the imaging apparatuses according to the embodiments of the present invention output image signals corresponding to optical images formed by the high performance imaging lenses according to the embodiments of the present invention. Therefore, photographed images having high resolution and wide angles of view can be obtained, while achieving a shortening of the apparatus size.

Here, two preferred examples of configurations of the imaging lens L and the advantageous effects obtained thereby will be described. Note that the preferred configurations of the imaging lens L described above may be applied to both of these preferred configurations.

The first configuration is that in which the imaging lens L substantially consists of five lenses, including: a first lens L1 having a positive refractive power and a convex surface toward the object side; a second lens L2 having a negative refractive power and is of a meniscus shape with a concave surface toward the object side; a third lens L3 having a positive refractive power and is of a meniscus shape with a convex surface toward the object side; a fourth lens L4 having a positive refractive power and is of a meniscus shape with a concave surface toward the object side; and a fifth lens L5 having a negative refractive power and is of a meniscus shape with a convex surface toward the object side, the surface thereof toward the image side being of an aspherical shape having at least one inflection point within a range from an intersection of a principal light ray at a maximum angle of view with the surface toward the image side inwardly toward the optical axis in the radial direction, provided in this order from the object side; and the imaging lens satisfies Conditional Formula (1). According to the first configuration, spherical aberration and astigmatism can be particularly favorably corrected, while a shortening of the total length of the lens can be achieved.

The second configuration is that in which the imaging lens L substantially consists of five lenses, including: a first lens L1 having a positive refractive power and a convex surface toward the object side; a second lens L2 having a negative refractive power and is of a meniscus shape with a concave surface toward the object side; a third lens L3 having a positive refractive power and is of a meniscus shape with a convex surface toward the object side; a fourth lens L4 having a positive refractive power and is of a meniscus shape with a concave surface toward the object side; and a fifth lens L5 having a negative refractive power and a concave surface toward the image side, the surface thereof toward the image side being of an aspherical shape having at least one inflection point within a range from an intersection of a principal light ray at a maximum angle of view with the surface toward the image side inwardly toward the optical axis in the radial direction, provided in this order from the object side; and the imaging lens satisfies Conditional Formula (2). According to the second configuration, distortion can be particularly favorably corrected, and increases in the incident angles of light rays that pass through the optical system and enter the image formation plane (imaging element) can be suppressed at peripheral angles of view. In addition, the second configuration can favorably shorten the total length of the lens with respect to image sizes. Therefore, the image size can be increased while maintaining the total length of the lens, which is advantageous from the viewpoint of being compatible with imaging elements that satisfy the demand for a greater number of pixels. This configuration is also advantageous from the viewpoint of maintaining an image while further shortening the total length of the lens.

As described above, in the imaging lenses L of the embodiments of the present invention, the configurations of each lens element are optimized in a lens configuration having a total of five lenses. Therefore, a lens system having a shortened total length with respect to image sizes that achieves a wider angle of view and a small F number, and realizes high imaging performance, can be realized.

In addition, in the case that the lens configurations of each of the first lens L1 through the fifth lens L5 are set such that the maximum angle of view in a state focused on an object at infinity is 75 degrees or greater as in the imaging lenses of the first through sixth embodiments, a shortening of the total length of the lens with respect to image sizes can be realized, and the imaging lens L may be favorably applied for use with imaging elements that satisfy demand regarding increased resolution, such as those in cellular telephones. Further, in the case that the lens configurations of each of the first lens L1 through the fifth lens L5 are set such that the value of Conditional Formula (2), which defines the ratio of the total length of the lens with respect to the paraxial image height, is within a range from 1.40 to 1.44 as in the imaging lenses of the first through sixth embodiments, a shortening of the total length of the lens with respect to image sizes can be favorably achieved, and the imaging lens L can be more favorably applied to cellular telephones and the like tat satisfy demand for an increased number of pixels. In contrast, the imaging lenses disclosed in Chinese Utility Model Publication No. 202815300, Taiwanese Patent Publication No. 201305652, and U.S. Pat. No. 8,179,614 have narrow maximum angles of view of 72.4 degrees to 73.6 degrees, and the values thereof corresponding to Conditional Formula (2) are 1.59 to 1.69, which are large values. Therefore, the total lengths of these lenses are excessively long with respect to image sizes, and it is difficult for these lenses to be applied to imaging elements that satisfy demand for an increased number of pixels.

In addition, in the case that the lens configurations of each of the first lens L1 through the fifth lens L5 of the imaging lens L are set such that the F number is less than 2.1 as in the imaging lenses of the first through sixth embodiments, demand for higher resolution can be favorably satisfied. In contrast, the imaging lenses disclosed in Chinese Utility Model Publication No. 202815300, Taiwanese Patent Publication No. 201305652, and U.S. Pat. No. 8,179,614 have F numbers of approximately 2.2 to 2.6, which are large values, and it is difficult for these lenses to sufficiently satisfy demand for higher resolution.

Next, specific examples of numerical values of the imaging lens of the present invention will be described. A plurality of examples of numerical values will be summarized and explained below.

Table 1 and Table 2 below show specific lens data corresponding to the configuration of the imaging lens illustrated in FIG. 1. Table 1 shows basic lens data of the imaging lens, and Table 2 shows data related to aspherical surfaces. In the lens data of Table 1, ith lens surface numbers that sequentially increase from the object side to the image side, with surface of an optical element most toward the object side designated as first, are shown in the column Si for the imaging lens of Example 1. The radii of curvature (mm) of ith surfaces from the object side corresponding to the symbols Ri illustrated in FIG. 1 are shown in the column Ri. Similarly, the distances between an ith surface Si and an i+1st surface Si+1 from the object side along the optical axis Z are shown in the column Di. The refractive indices of jth optical elements from the object side with respect to the d line (wavelength: 587.6 nm) are shown in the column Ndj. The Abbe's numbers of the jth optical elements with respect to the d line are shown in the column vdj.

Table 1 also shows the aperture stop St and the optical member CG. The signs of the radii of curvature are positive for surface shapes having convex surfaces toward the object side, and negative for surface shapes having convex surfaces toward the image side. In addition, the values of the focal length f (mm) of the entire system, the back focus Bf(mm), the F number Fno., and the maximum angle of view 2ω (°) are shown as data above the lens data. Note that the back focus Bf is represented as an air converted value.

A "*" mark is appended to the surface numbers of aspherical surfaces in the basic lens data of Table 1. In the imaging lens of Example 1, both of the surfaces of the first lens L1 through the fifth lens L5 are all aspherical in shape. In the basic lens data of Table 1, numerical values of radii of curvature in the vicinity of the optical axis (paraxial radii of curvature) are shown as the radii of curvature of the aspherical surfaces.

Table 2 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E-02" indicates that the numerical value is "1.0·10$^{-2}$".

The values of coefficients An and KA represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the apex of the aspherical surface.

$$Z = \frac{C \times h^2}{1 + \sqrt{1 - KA \times C^2 \times h^2}} + \sum_n An \times h^n \quad (A)$$

wherein: Z is the depth of the aspherical surface (mm), h is the distance from the optical axis to the surface of the lens (height) (mm), C is the paraxial curvature=1/R (R is the paraxial radius of curvature), An is an nth ordinal aspherical surface coefficient (n is an integer 3 or greater), and KA is an aspherical surface coefficient.

Specific lens data corresponding to the configurations of the imaging lenses illustrated in FIG. 2 through FIG. 6 are shown in Table 3 through Table 12 as Example 2 through Example 6. In the imaging lenses of Examples 1 through 6, both of the surfaces of the first lens L1 through the fifth lens L5 are all aspherical surfaces.

Figure 8:
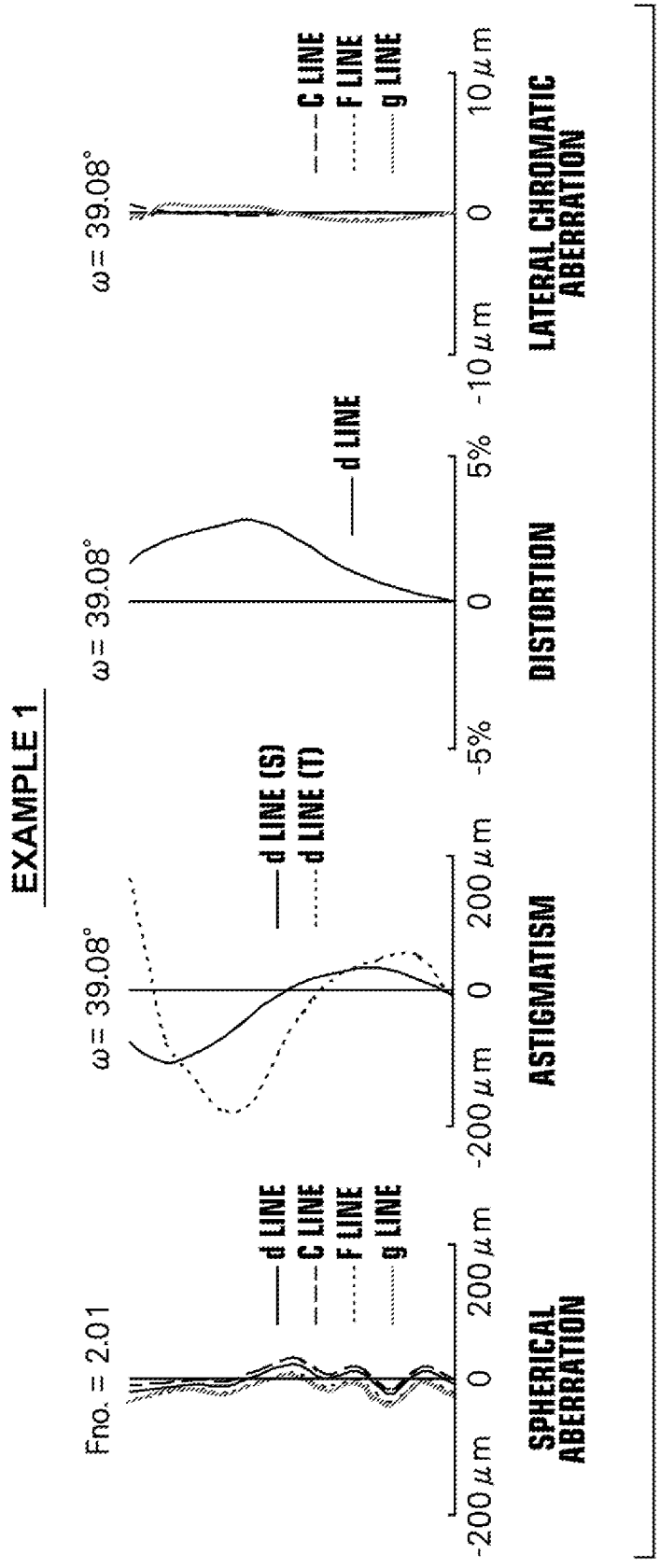
FIG. 8 is a collection of diagrams that illustrate aberrations of the imaging lens of Example 1, wherein the diagrams illustrate spherical aberration, astigmatism, distortion, and lateral chromatic aberration, in this order from the left side of the drawing sheet.
Figure 9:
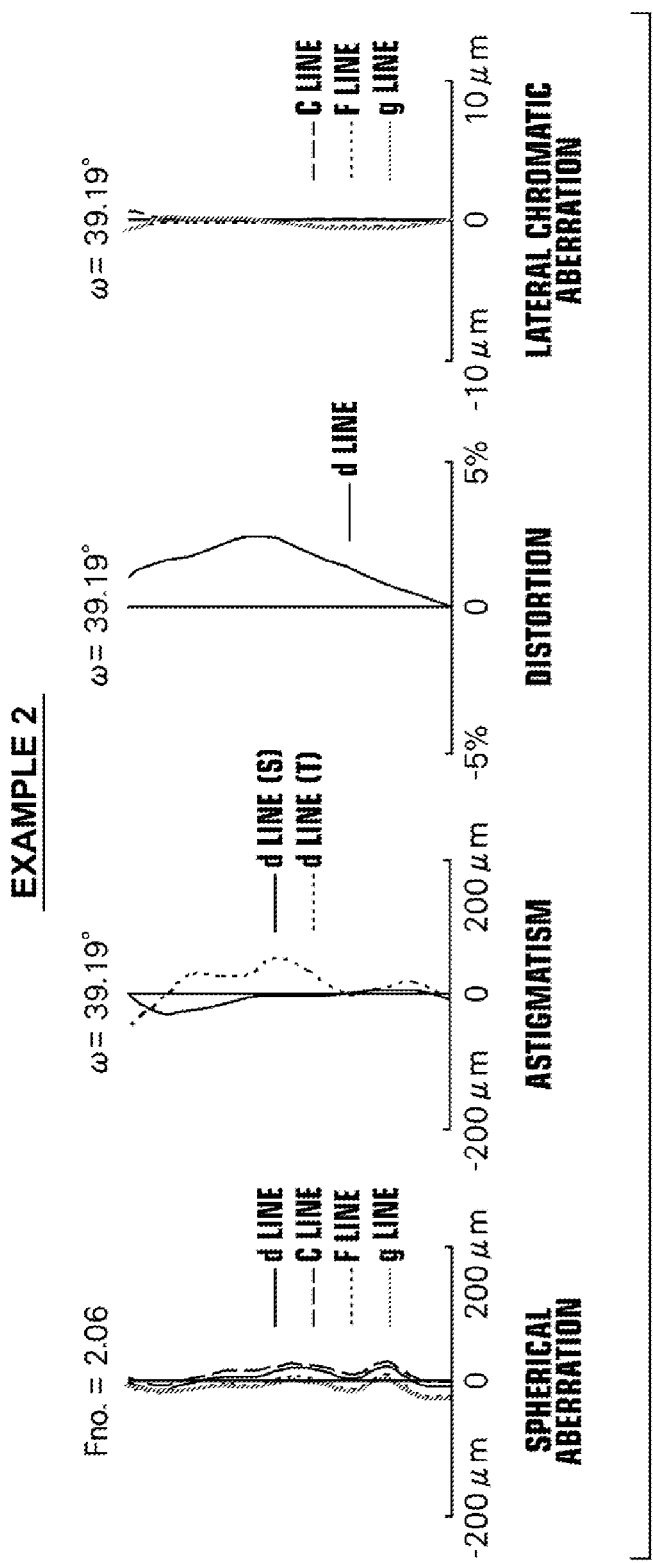
FIG. 9 is a collection of diagrams that illustrate aberrations of the imaging lens of Example 2, wherein the diagrams illustrate spherical aberration, astigmatism, distortion, and lateral chromatic aberration, in this order from the left side of the drawing sheet.
Figure 10:
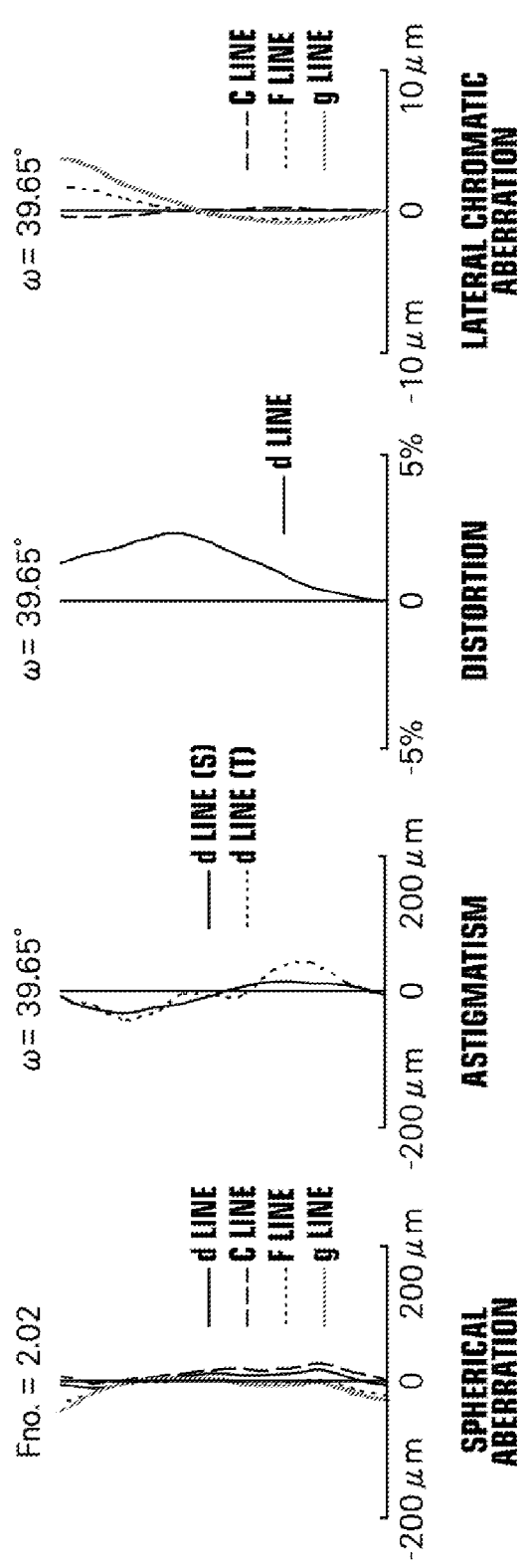
FIG. 10 is a collection of diagrams that illustrate aberrations of the imaging lens of Example 3, wherein the diagrams illustrate spherical aberration, astigmatism, distortion, and lateral chromatic aberration, in this order from the left side of the drawing sheet.
Figure 11:
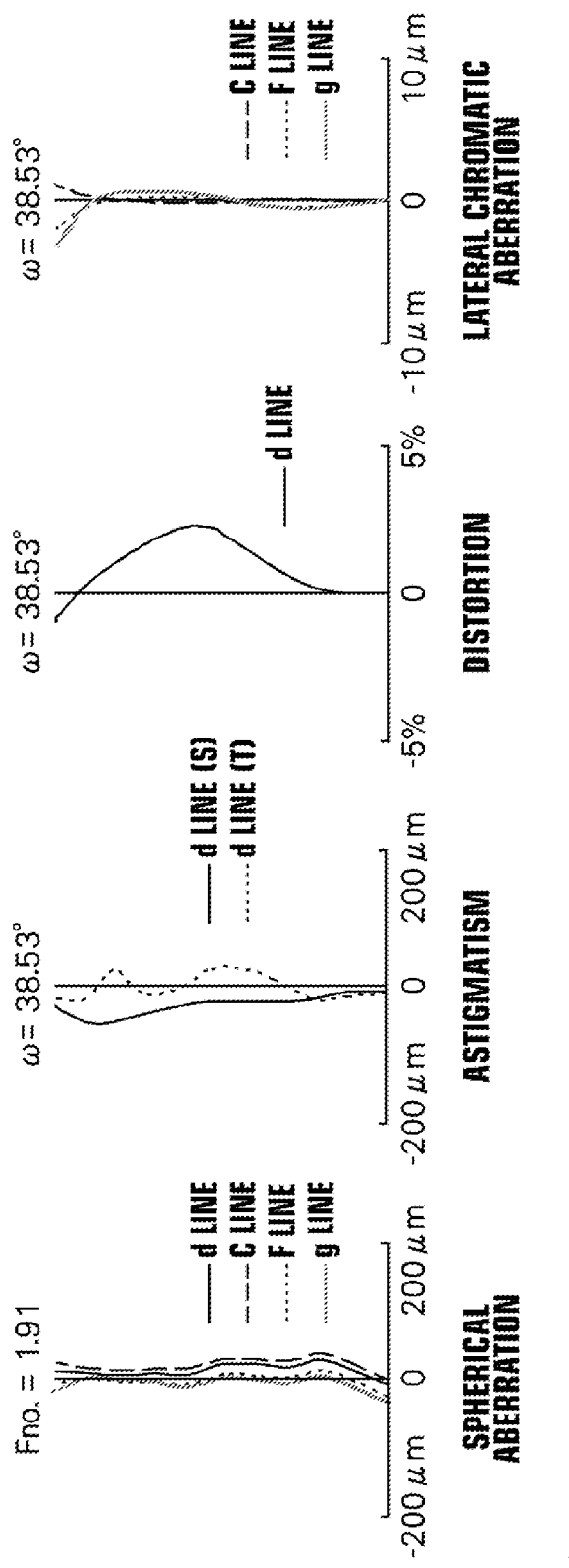
FIG. 11 is a collection of diagrams that illustrate aberrations of the imaging lens of Example 4, wherein the diagrams illustrate spherical aberration, astigmatism, distortion, and lateral chromatic aberration, in this order from the left side of the drawing sheet.
Figure 12:
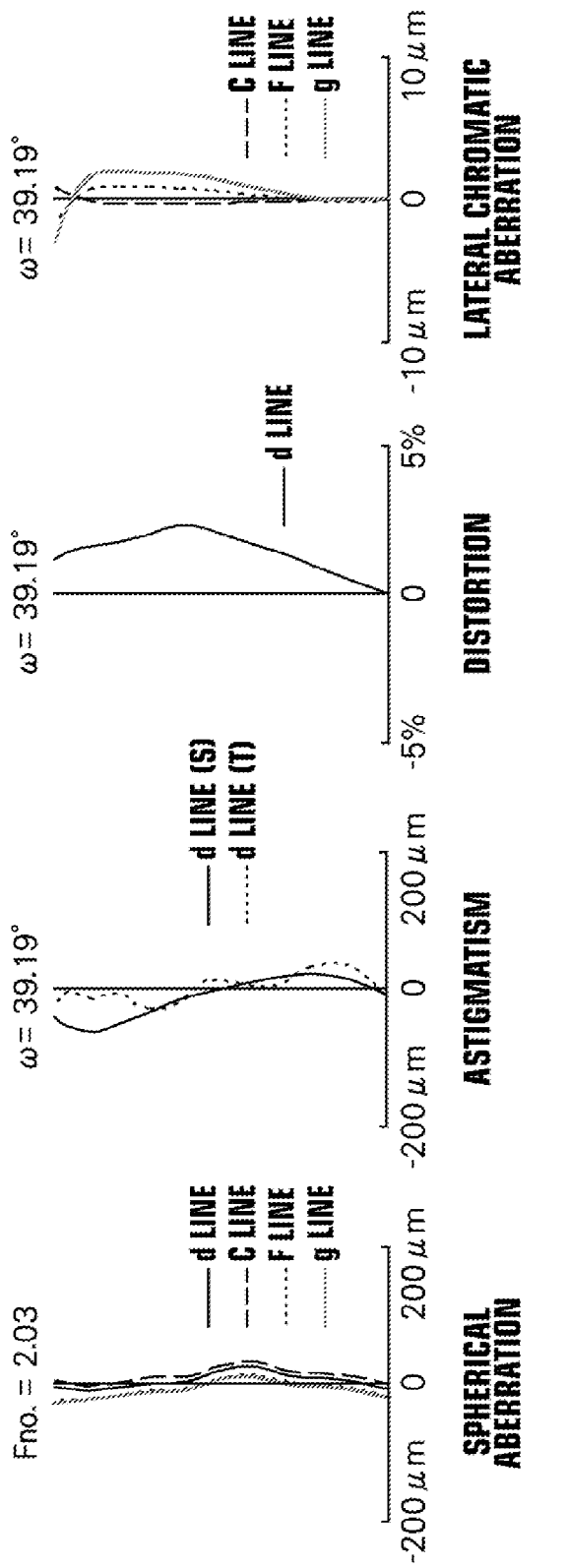
FIG. 12 is a collection of diagrams that illustrate aberrations of the imaging lens of Example 5, wherein the diagrams illustrate spherical aberration, astigmatism, distortion, and lateral chromatic aberration, in this order from the left side of the drawing sheet.
Figure 13:
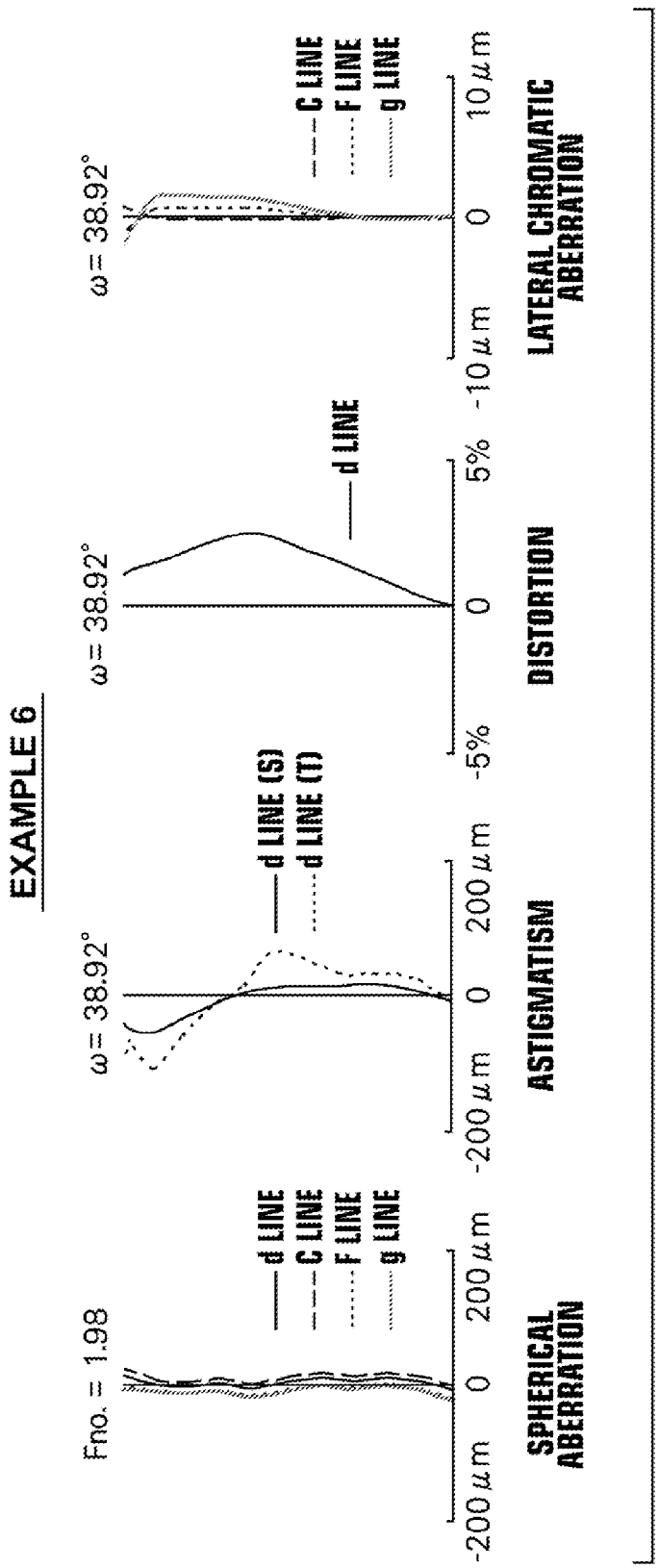
FIG. 13 is a collection of diagrams that illustrate aberrations of the imaging lens of Example 6, wherein the diagrams illustrate spherical aberration, astigmatism, distortion, and lateral chromatic aberration, in this order from the left side of the drawing sheet.

FIG. 8 is a collection of diagrams that illustrate aberrations of the imaging lens of Example 1, wherein the diagrams illustrate the spherical aberration, the astigmatism (field curvature), the distortion and the lateral chromatic aberration (chromatic aberration of magnification) of the imaging lens of Example 1, respectively, in this order from the left side of the drawing sheet. Each of the diagrams that illustrate the spherical aberration, the astigmatism (field curvature), and the distortion illustrate aberrations using the d line (wavelength: 587.6 nm) as a reference wavelength. The diagram that illustrates spherical aberration also shows aberrations related to the F line (wavelength: 486.1 nm), the C line (wavelength: 656.3 nm), and the g line (wavelength: 435.8 nm). The diagram that illustrates lateral chromatic aberration shows aberrations related to the F line, the C line, and the g line. In the diagram that illustrates astigmatism, aberration in the sagittal direction (S) is indicated by a solid line, while aberration in the tangential direction (T) is indicated by a broken line. In addition, "Fno." denotes F numbers, and "ω" denotes a half value of the maximum angle of view in a state focused on an object at infinity.

Similarly, the aberrations of the imaging lens of Example 2 through Example 6 are illustrated in FIG. 9 through FIG. 13. The diagrams that illustrate aberrations in FIG. 9 through FIG. 13 are for those in which the object distance is infinity.

Table 13 shows values corresponding to Conditional Formulae (1) through (7), respectively summarized for each of Examples 1 through 6.

Note that each of the tables show numerical values which are rounded off at a predetermined number of digits. With respect to the units of the numerical values, " " is used for degrees and "mm" is used for lengths. However, these are merely examples, and other appropriate units may be employed, because it is possible to utilize optical systems if they are proportionately enlarged or proportionately miniaturized.

As can be understood from each set of numerical value data and from the diagrams that illustrate aberrations, the imaging lenses of Examples 1 through 6 have widened maximum angles of view of 75° or greater in a state focused on an object at infinity, shortened total lengths with respect to image sizes, small F numbers, favorably correct various aberrations, and realize high imaging performance from a central angle of view to peripheral angles of view.

The present invention has been described using the embodiments and the Examples. However, the imaging lens of the present invention is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples of numerical values, and may be other values.

In addition, the Examples are described under the presumption that they are to be utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example.

TABLE 1

Example 1
f = 3.728, Bf = 0.955, Fno = 2.01, 2ω = 78.16

| Si | Ri | Di | Ndj | vdj |
|---|---|---|---|---|
| 1 (aperture stop) | ∞ | −0.240 | | |
| *2 | 1.42404 | 0.628 | 1.54488 | 54.87 |
| *3 | −10.84071 | 0.101 | | |
| *4 | −2.34452 | 0.250 | 1.63350 | 23.62 |
| *5 | −16.42257 | 0.267 | | |
| *6 | 5.88404 | 0.250 | 1.63350 | 23.62 |
| *7 | 8.19485 | 0.378 | | |
| *8 | −1.99781 | 0.572 | 1.54488 | 54.87 |
| *9 | −1.17793 | 0.497 | | |
| *10 | 8.14725 | 0.360 | 1.54488 | 54.87 |
| *11 | 1.32870 | 0.408 | | |
| 12 | ∞ | 0.210 | 1.51633 | 64.14 |
| 13 | ∞ | 0.409 | | |
| 14 (imaging surface) | ∞ | | | |

*aspherical surface

TABLE 2

Example 1: Aspherical Surface Data

| Surface Number | KA | A3 | A4 | A5 | A6 |
|---|---|---|---|---|---|
| 2 | −2.5170823E−02 | 0.0000000E+00 | −2.9858617E+00 | 5.7987329E+01 | −4.6757139E+02 |
| 3 | 2.7648309E+00 | 0.0000000E+00 | −1.0155450E+00 | 2.0076911E+01 | −1.5536528E+02 |
| 4 | −3.6056066E+00 | 0.0000000E+00 | 2.8824816E−01 | 1.3404005E+00 | −5.4859706E+00 |
| 5 | −9.9999986E+00 | 0.0000000E+00 | 3.5531213E−01 | 2.3579061E−01 | −2.0368338E+00 |
| 6 | 5.3333697E+00 | 0.0000000E+00 | −3.7467509E−03 | −9.2030341E−02 | −1.3166643E+00 |
| 7 | 9.9987158E+00 | 0.0000000E+00 | −1.3759376E−01 | 3.8164610E−01 | 6.7200434E−01 |
| 8 | 3.5486920E−01 | 0.0000000E+00 | −1.3934698E−01 | 1.6181464E−02 | 9.6779201E+00 |
| 9 | −2.5650089E−01 | 0.0000000E+00 | 1.0315139E+00 | 2.0182278E+00 | −1.3793770E+01 |
| 10 | 8.1761596E+00 | 0.0000000E+00 | −3.2831131E−01 | 9.2489318E−02 | 5.2209488E−02 |
| 11 | −3.7525122E−01 | 0.0000000E+00 | −5.7096805E−01 | 2.7849740E−01 | 7.3054159E−01 |

| | A7 | A8 | A9 | A10 | A11 |
|---|---|---|---|---|---|
| 2 | 2.0425809E+03 | −5.2066693E+03 | 7.6033393E+03 | −5.4282891E+03 | 1.1169928E+03 |
| 3 | 6.4067704E+02 | −1.4564720E+03 | 1.5155981E+03 | 4.3138523E+02 | −2.6121465E+03 |
| 4 | 4.9737186E+00 | 3.9894603E+00 | 9.0238827E+00 | −6.1880969E+01 | 7.1861642E+01 |
| 5 | 3.6213330E+00 | −1.9767944E+00 | −4.6256460E+00 | 7.6843995E+00 | 6.9185498E+00 |
| 6 | 2.5058495E+00 | 3.7922525E+00 | −1.8360908E+01 | 2.1764146E+01 | −1.5981394E+01 |
| 7 | −6.6937802E+00 | 1.5001232E+01 | −2.0766593E+01 | 2.4021999E+01 | −9.8561300E+00 |
| 8 | −5.6184751E+01 | 1.5470895E+02 | −2.3500067E+02 | 1.7165267E+02 | 5.6261232E+01 |
| 9 | 4.4820613E+01 | −8.1479963E+01 | 8.1010063E+01 | −3.0543779E+01 | −1.6319922E+00 |
| 10 | 3.9015293E−01 | −6.2843586E−01 | 2.2001147E−01 | 1.2795123E−01 | −9.9011195E−02 |
| 11 | −1.2919965E+00 | 7.9482645E−01 | 8.4258087E−02 | −4.3272944E−01 | 2.2177576E−01 |

| | A12 | A13 | A14 | A15 | A16 |
|---|---|---|---|---|---|
| 2 | −2.8937747E+03 | 1.0115916E+04 | −1.2104317E+04 | 6.5417212E+03 | −1.3749691E+03 |
| 3 | 1.1691020E+03 | 3.1027749E+03 | −4.8329815E+03 | 2.7749523E+03 | −5.9663248E+02 |
| 4 | 1.7330914E+00 | −1.5942659E+01 | −6.9652134E+01 | 9.1276352E+01 | −3.1328407E+01 |
| 5 | −1.5075702E+01 | −2.4545297E+01 | 7.1736418E+01 | −5.8697668E+01 | 1.6620445E+01 |
| 6 | 2.5986162E+01 | −1.3657259E+01 | −4.6222883E+01 | 6.8110015E+01 | −2.6881712E+01 |
| 7 | −3.2003888E+01 | 5.4278462E+01 | −2.4885859E+01 | −4.6965860E+00 | 4.6136396E+00 |
| 8 | −7.5149715E+01 | −3.6554635E+01 | 1.2838651E+02 | −8.6828181E+01 | 1.9794498E+01 |
| 9 | 1.5730489E+01 | 5.8224813E+00 | −1.1539110E+01 | 5.0672211E+00 | −7.6369467E−01 |
| 10 | −4.2837916E−03 | 3.0504564E−02 | −1.8047133E−02 | 5.2690366E−03 | −6.2901349E−04 |
| 11 | 2.2143550E−02 | −6.9548878E−02 | 3.1132875E−02 | −6.1938965E−03 | 4.8191846E−04 |

TABLE 3

Example 2
f = 3.727, Bf = 0.956, Fno = 2.06, 2ω = 78.38

| Si | Ri | Di | Ndj | νdj |
|---|---|---|---|---|
| 1 (aperture stop) | ∞ | −0.240 | | |
| *2 | 1.42048 | 0.631 | 1.54488 | 54.87 |
| *3 | −12.03216 | 0.093 | | |
| *4 | −2.35189 | 0.250 | 1.63350 | 23.62 |
| *5 | −15.85399 | 0.264 | | |
| *6 | 5.86443 | 0.251 | 1.63350 | 23.62 |
| *7 | 8.52954 | 0.379 | | |
| *8 | −1.99169 | 0.577 | 1.54488 | 54.87 |
| *9 | −1.15622 | 0.497 | | |
| *10 | 8.15354 | 0.360 | 1.54488 | 54.87 |
| *11 | 1.26808 | 0.408 | | |
| 12 | ∞ | 0.210 | 1.51633 | 64.14 |
| 13 | ∞ | 0.410 | | |
| 14 (imaging surface) | ∞ | | | |

*aspherical surface

TABLE 4

Example 2: Aspherical Surface Data

| Surface Number | KA | A3 | A4 | A5 | A6 |
|---|---|---|---|---|---|
| 2 | 1.7499070E−01 | 0.0000000E+00 | 6.0187145E−01 | −1.1236136E+01 | 7.9379374E+01 |
| 3 | −7.1982468E+00 | 0.0000000E+00 | −2.3751967E−01 | 5.3256838E+00 | −4.2759692E+01 |
| 4 | −3.7179221E+00 | 0.0000000E+00 | 3.1405798E−01 | 1.2740142E+00 | −4.7281485E+00 |
| 5 | −6.5201534E+00 | 0.0000000E+00 | 4.2687117E−01 | 9.7047578E−02 | −2.3815085E+00 |
| 6 | 5.1300872E+00 | 0.0000000E+00 | 5.4230059E−02 | −3.6934208E−01 | 3.4767380E−01 |
| 7 | −3.0213015E−01 | 0.0000000E+00 | −3.1430421E−02 | 4.0607054E−01 | −2.5745630E+00 |
| 8 | 3.1900344E−01 | 0.0000000E+00 | −1.0394298E−01 | −1.0091655E+00 | 1.6810339E+01 |
| 9 | −2.4833107E−01 | 0.0000000E+00 | 4.3210747E−01 | −3.5351434E+00 | 1.6952345E+01 |
| 10 | 8.7845468E+00 | 0.0000000E+00 | −3.3751483E−01 | −3.3658825E−02 | 5.2723164E−01 |
| 11 | −3.4858579E−01 | 0.0000000E+00 | −6.0897199E−01 | 2.0859938E−01 | 1.1442684E+00 |

TABLE 4-continued

Example 2: Aspherical Surface Data

|   | A7 | A8 | A9 | A10 | A11 |
|---|---|---|---|---|---|
| 2 | −2.6440639E+02 | 3.6305131E+02 | 1.8406598E+02 | −9.6975384E+02 | −5.5442005E+02 |
| 3 | 1.9149192E+02 | −4.6253743E+02 | 4.1199525E+02 | 6.8553588E+02 | −2.3199029E+03 |
| 4 | −1.2761436E+00 | 3.2799373E+01 | −7.5338273E+01 | 1.0148956E+02 | −1.3420517E+02 |
| 5 | 4.0155805E+00 | 3.1159900E+00 | −2.0467180E+01 | 2.5710872E+01 | −3.1020144E+00 |
| 6 | −4.2767182E+00 | 1.6554719E+01 | −1.5429063E+01 | −3.9435444E+01 | 9.6894363E+01 |
| 7 | 8.7412679E+00 | −2.1713974E+01 | 3.1833737E+01 | −1.7558333E+01 | −1.2526331E+01 |
| 8 | −8.0283981E+01 | 1.9210807E+02 | −2.2189174E+02 | −3.5599512E+00 | 3.6778743E+02 |
| 9 | −4.7457842E+01 | 7.8488373E+01 | −6.9937201E+01 | 1.4041085E+01 | 3.7111677E+01 |
| 10 | −4.9138698E−01 | 2.9843927E−01 | −2.0686267E−01 | 4.4733126E−03 | 1.3461276E−01 |
| 11 | −2.2072284E+00 | 2.0978222E+00 | −1.1563791E+00 | 3.1324483E−01 | −7.7050477E−03 |

|   | A12 | A13 | A14 | A15 | A16 |
|---|---|---|---|---|---|
| 2 | 5.6279827E+03 | −9.9578480E+03 | 8.6950515E+03 | −3.9285563E+03 | 7.3606656E+02 |
| 3 | 2.4345224E+03 | −5.2492614E+02 | −1.0667500E+03 | 9.2105602E+02 | −2.3285797E+02 |
| 4 | 1.4930036E+02 | −3.1749844E+01 | −1.4068569E+02 | 1.4963120E+02 | −4.6641213E+01 |
| 5 | −1.3913356E+01 | 1.1819218E−01 | 1.3896952E+01 | −9.0085425E+00 | 1.7010840E+00 |
| 6 | −3.4861053E+01 | −9.0414353E+01 | 1.0174890E+02 | −2.7295578E+01 | −3.8703461E+00 |
| 7 | 1.5426587E+01 | 7.7661523E+00 | −1.3175765E+01 | 2.1608123E+00 | 1.1798500E+00 |
| 8 | −4.7674112E+02 | 2.2884046E+02 | 2.6557385E+01 | −6.7043074E+01 | 1.8535290E+01 |
| 9 | −4.1135217E+01 | 1.7328168E+01 | −1.1871056E+00 | 3.4756616E−01 | |
| 10 | −6.8045543E−02 | −1.1130608E−02 | 1.6770996E−02 | −4.4284880E−03 | 3.6894054E−04 |
| 11 | 7.0323642E−03 | −2.5487301E−02 | 1.3542164E−02 | −2.9560817E−03 | 2.4139869E−04 |

TABLE 5

Example 3
f = 3.660, Bf = 1.109, Fno = 2.02, 2ω = 79.30

| Si | Ri | Di | Ndj | vdj |
|---|---|---|---|---|
| 1 (aperture stop) | ∞ | −0.221 | | |
| *2 | 1.48711 | 0.576 | 1.54488 | 54.87 |
| *3 | −48.69923 | 0.090 | | |
| *4 | −2.59267 | 0.258 | 1.63350 | 23.62 |
| *5 | −11.74413 | 0.144 | | |
| *6 | 2.69604 | 0.256 | 1.63350 | 23.62 |
| *7 | 2.63066 | 0.483 | | |
| *8 | −3.37527 | 0.710 | 1.54488 | 54.87 |
| *9 | −1.07355 | 0.414 | | |
| *10 | 65.78190 | 0.261 | 1.54488 | 54.87 |
| *11 | 1.23284 | 0.408 | | |
| 12 | ∞ | 0.210 | 1.51633 | 64.14 |
| 13 | ∞ | 0.563 | | |
| 14 (imaging surface) | ∞ | | | |

*aspherical surface

TABLE 6

Example 3: Aspherical Surface Data

| Surface Number | KA | A3 | A4 | A5 | A6 |
|---|---|---|---|---|---|
| 2 | −1.4088685E+00 | 0.0000000E+00 | 6.8322612E−02 | −5.3240416E−01 | 4.6053536E+00 |
| 3 | −7.7480709E+00 | 0.0000000E+00 | −3.4870417E−01 | 3.0571700E+00 | −1.5166393E+01 |
| 4 | −2.8575546E+01 | 0.0000000E+00 | −8.1078728E−02 | 1.5975657E+00 | −7.6273157E+00 |
| 5 | −1.9425292E+00 | 0.0000000E+00 | −7.8675452E−02 | 3.4850945E+00 | −2.0997923E+01 |
| 6 | −3.9293239E+00 | 0.0000000E+00 | −5.0613466E−01 | 2.3139225E+00 | −8.3239934E+00 |
| 7 | −1.9602572E−01 | 0.0000000E+00 | −3.2821284E−02 | −4.8828018E−01 | 7.9968368E−01 |
| 8 | −3.8745971E−01 | 0.0000000E+00 | −8.8598471E−02 | 1.1310818E+00 | −2.0860026E+00 |
| 9 | 3.2506603E−01 | 0.0000000E+00 | 6.4224152E−01 | −4.4916262E−01 | 2.1136598E+01 |
| 10 | 1.5510672E+00 | 0.0000000E+00 | −2.6976787E−01 | 1.2241351E−01 | −1.3578743E−01 |
| 11 | −1.7430779E−01 | 0.0000000E+00 | −7.4487498E−01 | 8.2529406E−01 | −3.8404107E−01 |

|   | A7 | A8 | A9 | A10 | A11 |
|---|---|---|---|---|---|
| 2 | −1.5351350E+01 | 2.2267411E+01 | −9.8051395E+00 | 5.9443522E+00 | −5.6621313E+01 |
| 3 | 4.5362648E+01 | −7.4108755E+01 | −1.5795975E+00 | 2.8861210E+02 | −6.0063409E+02 |
| 4 | 2.2891870E+01 | −4.7993237E+01 | 6.2211437E+01 | −6.6383894E+00 | −1.3020378E+02 |
| 5 | 7.5979423E+01 | −1.7161782E+02 | 2.1243348E+02 | −6.4125109E+01 | −2.6839518E+01 |
| 6 | 2.4503298E+01 | −8.8831607E+01 | 2.4720186E+02 | −3.2514548E+02 | −3.1054662E+01 |
| 7 | −2.1841829E−02 | −9.0057662E−01 | −1.6879037E+00 | 4.1178680E+00 | 5.2849658E+00 |
| 8 | −1.7284114E+01 | 9.6099662E+01 | −2.0106409E+02 | 1.8351386E+02 | −1.9439067E+01 |
| 9 | −5.6744098E+01 | 8.4703239E+01 | −5.6909364E+01 | −1.5406461E+01 | 5.1768567E+01 |
| 10 | 6.2516346E−01 | −8.7472325E−01 | 5.4250310E−01 | −1.6031006E−01 | 1.3232722E−02 |
| 11 | 6.5700470E−02 | 8.5778834E−02 | −2.0286287E−01 | 1.7823424E−01 | −5.0739758E−02 |

TABLE 6-continued

Example 3: Aspherical Surface Data

| | A12 | A13 | A14 | A15 | A16 |
|---|---|---|---|---|---|
| 2 | 1.1230858E+02 | −8.6384485E+01 | 1.7341765E+01 | 1.0198367E+01 | −4.0841693E+00 |
| 3 | 4.8953907E+02 | 5.2288012E+01 | −4.1149106E+02 | 2.9629176E+02 | −7.1936083E+01 |
| 4 | 1.8272082E+02 | −6.9135400E+00 | −1.9502241E+02 | 1.7481367E+02 | −4.9613923E+01 |
| 5 | −6.3854470E+02 | 1.9894397E+03 | −2.5542230E+03 | 1.5965718E+03 | −4.0174613E+02 |
| 6 | 5.1332574E+02 | −2.0141515E+02 | −6.3904776E+02 | 7.6292601E+02 | −2.5665569E+02 |
| 7 | −1.8834899E+01 | 1.4384166E+01 | 1.7302255E+00 | −6.7262874E+00 | 2.2783547E+00 |
| 8 | −6.1938964E+01 | −3.9601069E+01 | 1.2230152E+02 | −7.8517137E+01 | 1.6944873E+01 |
| 9 | −2.1176786E+01 | −1.8042773E+01 | 2.2251784E+01 | −8.9474275E+00 | 1.3226049E+00 |
| 10 | 6.0436664E−03 | 1.4854825E−02 | −2.2818661E−02 | 1.0572152E−02 | −1.6382448E−03 |
| 11 | −2.0445611E−02 | 1.8662435E−02 | −4.8058229E−03 | 3.5744103E−04 | 2.0389794E−05 |

TABLE 7

Example 4
f = 3.728, Bf = 0.965, Fno = 1.91, 2ω = 77.06

| Si | Ri | Di | Ndj | νdj |
|---|---|---|---|---|
| 1 (aperture stop) | ∞ | −0.240 | | |
| *2 | 1.47156 | 0.721 | 1.54488 | 54.87 |
| *3 | −13.82265 | 0.101 | | |
| *4 | −2.32195 | 0.250 | 1.63350 | 23.62 |
| *5 | −9.70661 | 0.230 | | |
| *6 | 5.87171 | 0.265 | 1.63350 | 23.62 |
| *7 | 8.64828 | 0.378 | | |
| *8 | −1.93548 | 0.496 | 1.54488 | 54.87 |
| *9 | −1.17425 | 0.480 | | |
| *10 | 7.97812 | 0.369 | 1.54488 | 54.87 |
| *11 | 1.33634 | 0.408 | | |
| 12 | ∞ | 0.210 | 1.51633 | 64.14 |
| 13 | ∞ | 0.410 | | |
| 14 (imaging surface) | ∞ | | | |

*aspherical surface

TABLE 8

Example 4: Aspherical Surface Data

| Surface Number | KA | A3 | A4 | A5 | A6 |
|---|---|---|---|---|---|
| 2 | 2.8910274E−01 | 0.0000000E+00 | −3.2847329E−02 | −6.5220458E−01 | 6.8716187E+00 |
| 3 | −7.9914458E+00 | 0.0000000E+00 | −2.1834262E−01 | 5.0155264E+00 | −4.4118468E+01 |
| 4 | −4.7852614E+00 | 0.0000000E+00 | 3.2363223E−01 | −4.3750650E−01 | 1.0587815E+01 |
| 5 | −5.3487327E+00 | 0.0000000E+00 | 4.4523814E−01 | 1.3331642E−01 | −4.6756081E+00 |
| 6 | −2.5226232E+00 | 0.0000000E+00 | 6.6564375E−02 | 1.2847966E−01 | −4.2529904E+00 |
| 7 | 2.3694588E+00 | 0.0000000E+00 | 6.0524566E−02 | −1.5303547E−01 | −6.7699354E−01 |
| 8 | 2.1454468E+00 | 0.0000000E+00 | 6.3545373E−02 | 8.3643967E−01 | 4.2602097E−01 |
| 9 | −1.5599856E−01 | 0.0000000E+00 | 3.3494287E−01 | −1.9108191E+00 | 8.4121457E+00 |
| 10 | 9.9564430E+00 | 0.0000000E+00 | −2.6060039E−01 | 4.7753666E−02 | 1.1501204E−01 |
| 11 | −2.5624591E−01 | 0.0000000E+00 | −5.6909590E−01 | 4.7132417E−01 | 4.4966201E−02 |

| | A7 | A8 | A9 | A10 | A11 |
|---|---|---|---|---|---|
| 2 | −2.6390687E+01 | 5.3453751E+01 | −5.8208923E+01 | 2.2184148E+01 | 1.8354971E+01 |
| 3 | 2.1203863E+02 | −5.7716808E+02 | 8.4902990E+02 | −5.5549396E+02 | 2.2895632E+02 |
| 4 | −7.0270431E+01 | 2.1510198E+02 | −3.5659927E+02 | 3.0207279E+02 | −5.7307957E+01 |
| 5 | 1.9946714E+01 | −4.6355803E+01 | 5.3338897E+01 | −5.3128507E+00 | −5.8359797E+01 |
| 6 | 1.3400117E+01 | −2.1337730E+01 | 2.8510897E+01 | −4.4373077E+01 | 3.1637016E+01 |
| 7 | 2.7426053E+00 | −4.1424862E+00 | −8.8539868E−01 | 8.3057997E+00 | −3.9428406E+00 |
| 8 | −2.4307788E+01 | 1.0264213E+02 | −1.9726451E+02 | 1.5817795E+02 | 6.6358185E+01 |
| 9 | −2.1293028E+01 | 3.0752827E+01 | −2.3248958E+01 | 4.1446630E+00 | 6.9015439E+00 |
| 10 | −1.1212238E−02 | −7.6545604E−02 | 9.2784834E−03 | 3.3710792E−02 | −1.0135766E−02 |
| 11 | −2.5961187E−01 | 6.5630304E−02 | 9.7340346E−02 | −6.5037838E−02 | −1.2011628E−04 |

| | A12 | A13 | A14 | A15 | A16 |
|---|---|---|---|---|---|
| 2 | −5.7995009E+00 | −5.4057434E+01 | 8.5954914E+01 | −5.5329126E+01 | 1.3623590E+01 |
| 3 | −1.1840333E+03 | 2.8746406E+03 | −3.0583436E+03 | 1.5710218E+03 | −3.2137460E+02 |
| 4 | −1.2202330E+02 | 1.3354605E+02 | −9.5402017E+01 | 5.7178351E+01 | −1.6593373E+01 |
| 5 | 6.9942887E+01 | −5.4379635E+01 | 5.4089359E+01 | −4.0876815E+01 | 1.2255864E+01 |
| 6 | 1.2715328E+01 | 5.7913038E+01 | −2.3030818E+02 | 2.3485748E+02 | −7.9333174E+01 |
| 7 | −6.3981197E+00 | 3.3176084E+00 | 6.4965074E+00 | −6.4018535E+00 | 1.5917357E+00 |
| 8 | −2.5323310E+02 | 2.0692505E+02 | −5.6524666E+01 | −1.0286255E+01 | 6.2728826E+00 |
| 9 | −4.7468513E+00 | 2.2577027E−02 | 1.1188410E+00 | −4.8302863E−01 | 7.1505833E−02 |
| 10 | 2.5935882E−03 | −5.7113476E−03 | 2.4482247E−03 | −8.1891714E−05 | −6.6691205E−05 |
| 11 | 6.2736657E−03 | 5.8859577E−03 | −6.0618387E−03 | 1.8956530E−03 | −2.0859014E−04 |

TABLE 9

Example 5
f = 3.723, Bf = 0.980, Fno = 2.03, 2ω = 78.38

| Si | Ri | Di | Ndj | vdj |
|---|---|---|---|---|
| 1 (aperture stop) | ∞ | −0.240 | | |
| *2 | 1.47060 | 0.632 | 1.54488 | 54.87 |
| *3 | −11.76311 | 0.104 | | |
| *4 | −2.44204 | 0.250 | 1.63350 | 23.62 |
| *5 | −16.05397 | 0.249 | | |
| *6 | 5.52377 | 0.250 | 1.54488 | 54.87 |
| *7 | 9.16482 | 0.378 | | |
| *8 | −2.00703 | 0.558 | 1.54488 | 54.87 |
| *9 | −1.15407 | 0.496 | | |
| *10 | 8.24704 | 0.363 | 1.54488 | 54.87 |
| *11 | 1.26903 | 0.408 | | |
| 12 | ∞ | 0.210 | 1.51633 | 64.14 |
| 13 | ∞ | 0.434 | | |
| 14 (imaging surface) | ∞ | | | |

*aspherical surface

TABLE 11

Example 6
f = 3.663, Bf = 0.967, Fno = 1.98, 2ω = 77.84

| Si | Ri | Di | Ndj | vdj |
|---|---|---|---|---|
| 1 (aperture stop) | ∞ | −0.240 | | |
| *2 | 1.51517 | 0.637 | 1.54488 | 54.87 |
| *3 | −11.76718 | 0.109 | | |
| *4 | −2.48313 | 0.256 | 1.63350 | 23.62 |
| *5 | −14.50680 | 0.244 | | |
| *6 | 5.35565 | 0.250 | 1.54488 | 54.87 |
| *7 | 9.66177 | 0.378 | | |
| *8 | −2.02767 | 0.552 | 1.54488 | 54.87 |
| *9 | −1.14906 | 0.499 | | |
| *10 | 8.10926 | 0.367 | 1.54488 | 54.87 |
| *11 | 1.27126 | 0.408 | | |
| 12 | ∞ | 0.210 | 1.51633 | 64.14 |
| 13 | ∞ | 0.421 | | |
| 14 (imaging surface) | ∞ | | | |

*aspherical surface

TABLE 10

Example 5: Aspherical Surface Data

| Surface Number | KA | A3 | A4 | A5 | A6 |
|---|---|---|---|---|---|
| 2 | 1.6510975E−01 | 0.0000000E+00 | 7.6099051E−02 | −1.0506774E+00 | 8.5021449E+00 |
| 3 | 1.0000017E+01 | 0.0000000E+00 | 6.7720525E−02 | 5.7537434E−02 | −4.2305992E+00 |
| 4 | −3.6527845E+00 | 0.0000000E+00 | 1.8373016E−01 | 1.7170877E+00 | −6.6318925E+00 |
| 5 | −1.0000046E+01 | 0.0000000E+00 | 3.7322178E−01 | 1.2647144E−01 | −2.1929440E+00 |
| 6 | 4.6127716E+00 | 0.0000000E+00 | 8.7266630E−02 | −2.6739315E−01 | −1.6303155E+00 |
| 7 | 7.4123278E+00 | 0.0000000E+00 | 6.8640224E−03 | 6.9699826E−02 | −3.0309043E−01 |
| 8 | 6.9728084E−01 | 0.0000000E+00 | −3.4468094E−01 | 3.0158536E+00 | −1.0778342E+01 |
| 9 | −2.3834096E−01 | 0.0000000E+00 | 3.5270927E−01 | −2.2326158E+00 | 9.4559393E+00 |
| 10 | 9.1584377E+00 | 0.0000000E+00 | −3.5460895E−01 | 2.4735776E−01 | −6.3182892E−01 |
| 11 | −5.2862483E−01 | 0.0000000E+00 | −6.6657849E−01 | 8.1399241E−01 | −8.7394443E−01 |

| | A7 | A8 | A9 | A10 | A11 |
|---|---|---|---|---|---|
| 2 | −3.4694625E+01 | 7.2935032E+01 | −6.0044282E+01 | −4.8629855E+01 | 1.4581117E+02 |
| 3 | 3.9962417E+01 | −1.6288746E+02 | 3.1336708E+02 | −1.6476478E+02 | −4.6417323E+02 |
| 4 | 7.9360025E+00 | 4.5481330E+00 | −2.7482258E+01 | 6.4443862E+01 | −1.2957000E+02 |
| 5 | 4.7733960E+00 | −2.2964432E+00 | −7.7593373E+00 | 1.0149174E+01 | 7.6459976E+00 |
| 6 | 4.0448109E+00 | 9.8616524E−01 | −1.0500840E+01 | 4.0598776E+00 | −6.6769697E+00 |
| 7 | −1.7455977E+00 | 5.5112519E+00 | −3.5266174E+00 | −3.4594603E+00 | −4.1097720E−01 |
| 8 | 2.1527381E+01 | −1.9062066E+01 | −1.2000252E+01 | 4.5841462E+01 | −4.7859815E+01 |
| 9 | −2.4652579E+01 | 3.9017639E+01 | −3.5297432E+01 | 1.4438625E+01 | 3.6218413E−01 |
| 10 | 1.9327491E+00 | −2.6089396E+00 | 1.6718450E+00 | −3.4771416E−01 | −1.7605186E−01 |
| 11 | 1.3286874E+00 | −1.4472959E+00 | 7.4750997E−01 | 1.4842535E−02 | −2.0836660E−01 |

| | A12 | A13 | A14 | A15 | A16 |
|---|---|---|---|---|---|
| 2 | −1.0240817E+02 | −4.0048991E+00 | 3.7041599E+01 | −1.5065076E+01 | 1.4939936E+00 |
| 3 | 1.0149180E+03 | −8.3727096E+02 | 2.5755972E+02 | 3.6679980E+01 | −2.9340985E+01 |
| 4 | 1.3095498E+02 | 4.8136708E+01 | −2.3754370E+02 | 1.9980333E+02 | −5.6325739E+01 |
| 5 | −2.4816902E+01 | 2.5856794E+01 | −2.2001905E+01 | 1.4473647E+01 | −4.1377931E+00 |
| 6 | 5.0080565E+01 | −3.9839333E+01 | −6.4302603E+01 | 1.0381964E+02 | −4.0211854E+01 |
| 7 | 9.9428166E+00 | −3.9194206E+00 | −6.1779670E+00 | 4.6178239E+00 | −6.6972488E−01 |
| 8 | 5.6721938E+01 | −1.0795238E+02 | 1.2810006E−02 | −7.3337919E+01 | 1.6143287E+01 |
| 9 | 1.0833268E+00 | −6.0424157E+00 | 5.2569516E+00 | −1.9978919E+00 | 3.0051676E−01 |
| 10 | 8.7731353E−02 | 4.4363389E−02 | −4.9762024E−02 | 1.6433102E−02 | −1.9467069E−03 |
| 11 | 7.1745888E−02 | 2.0356595E−02 | −2.0810038E−02 | 5.6202537E−03 | −5.4216105E−04 |

TABLE 12

Example 6: Aspherical Surface Data

| Surface Number | KA | A3 | A4 | A5 | A6 |
|---|---|---|---|---|---|
| 2 | 1.6749949E−01 | 0.0000000E+00 | 1.5968496E−01 | −1.6740603E+00 | 1.2797661E+01 |
| 3 | 1.0000018E+01 | 0.0000000E+00 | 3.9243840E−02 | 5.2780327E−01 | −7.8279821E+00 |
| 4 | −3.5615427E+00 | 0.0000000E+00 | 5.4364414E−02 | 1.6344342E−01 | −2.8278471E+00 |
| 5 | −1.0000021E+01 | 0.0000000E+00 | 4.1388154E−01 | 1.0277332E−01 | −3.0584966E+00 |
| 6 | 4.1329497E+00 | 0.0000000E+00 | 5.2697241E−02 | −6.7684835E−02 | −1.0206848E+00 |
| 7 | 1.0000018E+01 | 0.0000000E+00 | −8.7812518E−02 | 2.9300233E−01 | −3.8121780E−01 |
| 8 | 4.2645185E−01 | 0.0000000E+00 | −3.0579386E−01 | 2.6295064E+00 | −1.0736971E+01 |
| 9 | −2.1959006E−01 | 0.0000000E+00 | 2.8525284E−01 | −1.5991355E−01 | 5.6670667E+00 |
| 10 | 1.0000009E+01 | 0.0000000E+00 | −3.4513983E−01 | 2.0452893E−02 | 2.7242700E−01 |
| 11 | −5.3346421E−01 | 0.0000000E+00 | −6.0975827E−01 | 4.1472530E−01 | 3.9604608E−01 |

| | A7 | A8 | A9 | A10 | A11 |
|---|---|---|---|---|---|
| 2 | −5.7806303E+01 | 1.5513321E+02 | −2.5060474E+02 | 2.2368776E+02 | −4.3257467E+01 |
| 3 | 4.7694492E+01 | −1.3363416E+02 | 1.0249620E+02 | 3.2049170E+02 | −7.9065387E+02 |
| 4 | −6.3057879E+00 | 2.4422102E+01 | −2.4979080E+01 | 9.9869493E+00 | −2.1022512E+01 |
| 5 | 7.5005252E+00 | −8.3504554E+00 | 8.3083954E+00 | −1.5688821E+01 | 1.9524835E+01 |
| 6 | −4.3648485E+00 | 3.1740230E+01 | −7.1603009E+01 | 7.4744242E+01 | −1.5015140E+01 |
| 7 | −1.0087830E+00 | −1.9381041E−01 | 8.5673776E+00 | −1.2060211E+01 | 2.1821486E+00 |
| 8 | 2.8630641E+01 | −5.1132346E+01 | 5.5297881E+01 | −2.0463432E+01 | −4.2321495E+01 |
| 9 | −1.2200115E+01 | 1.5702001E+01 | −1.1856275E+01 | 5.5891586E+00 | −1.0214927E+00 |
| 10 | 2.6433317E−02 | −2.4526957E−01 | 4.7317697E−02 | 6.4828420E−02 | −1.4251580E−02 |
| 11 | −8.7411080E−01 | 7.1030530E−01 | −2.9711008E−01 | 7.5894482E−03 | 7.9094966E−02 |

| | A12 | A13 | A14 | A15 | A16 |
|---|---|---|---|---|---|
| 2 | −1.3877345E+02 | 1.5586990E+02 | −5.0003358E+01 | −1.6599281E+01 | 1.1025031E+01 |
| 3 | 3.0435157E+02 | 1.0184115E+03 | −1.5923425E+03 | 9.3594478E+02 | −2.0556865E+02 |
| 4 | 2.4594839E+01 | 4.4056571E+01 | −1.0879241E+02 | 7.9614829E+01 | −2.0272840E+01 |
| 5 | −8.4816703E+00 | 1.0519964E+00 | −4.4289107E+00 | 3.7310273E+00 | −4.3613820E−01 |
| 6 | −9.7224000E+01 | 2.3752416E+02 | −2.9883735E+02 | 1.9711376E+02 | −5.3381100E+01 |
| 7 | −1.8668807E+00 | 1.2491667E+01 | −5.1796023E+00 | −7.0301048E+00 | 4.1996062E+00 |
| 8 | 1.0603208E+02 | −1.4497119E+02 | 1.2705392E+02 | −6.2587410E+01 | 1.2872694E+01 |
| 9 | −5.0042063E+00 | 9.9237328E+00 | −8.0868956E+00 | 3.0930815E+00 | −4.5935423E−01 |
| 10 | 6.4975002E−03 | −1.7370019E−02 | 8.5263441E−03 | −1.1708239E−03 | −1.8377930E−05 |
| 11 | −6.0251693E−02 | 2.7247461E−02 | −8.4856089E−03 | 1.6613093E−03 | −1.4864427E−04 |

TABLE 13

Values Related to Conditional Formulae

| Formula | Condition | Example 1 | Example 2 | Example 3 | Example 4 | Example 5 | Example 6 |
|---|---|---|---|---|---|---|---|
| 1 | f/f1 | 1.58 | 1.57 | 1.38 | 1.50 | 1.53 | 1.46 |
| 2 | TTL/(f · tanω) | 1.41 | 1.40 | 1.42 | 1.43 | 1.40 | 1.44 |
| 3 | f/f3 | 0.12 | 0.13 | 0.01 | 0.13 | 0.15 | 0.17 |
| 4 | f/(f3 · vd3) | 0.0050 | 0.0055 | 0.0005 | 0.0057 | 0.0027 | 0.0031 |
| 5 | L1F/Φ | 0.77 | 0.79 | 0.82 | 0.75 | 0.80 | 0.82 |
| 6 | f · tanω/L5r | 2.28 | 2.40 | 2.46 | 2.22 | 2.39 | 2.33 |
| 7 | f/f5 | −1.26 | −1.33 | −1.59 | −1.24 | −1.33 | −1.30 |

Note that the above paraxial radii of curvature, the distances among surfaces, the refractive indices, and the Abbe's numbers were obtained by measurements performed by specialists in the field of optical measurement, according to the methods described below.

The paraxial radii of curvature were obtained by measuring the lenses using an ultra high precision three dimensional measurement device UA3P (by Panasonic Factory Solutions K. K.) by the following procedures. A paraxial radius of curvature $R_m$ (m is a natural number) and a conical coefficient $K_m$ are preliminarily set and input into UA3P, and an nth order aspherical surface coefficient An of an aspherical shape formula is calculated from the input paraxial radius of curvature $R_m$ and conical coefficient $K_m$ and the measured data, using a fitting function of UA3P. $C=1/R_m$ and $KA=K_m−1$ are considered in the aforementioned aspherical surface shape formula (A). Depths Z of an aspherical surface in the direction of the optical axis corresponding to heights h from the optical axis are calculated from $R_m$, $K_m$, An, and the aspherical surface shape formula. The difference between the calculated depths Z and actually measured depth values Z' are obtained for each height h from the optical axis. Whether the difference is within a predetermined range is judged. In the case that the difference is within the predetermined range, $R_m$ is designated as the paraxial radius of curvature. On the other hand, in the case that the difference is outside the predetermined range, the value of at least one of $R_m$ and $K_m$ is changed, set as $R_{m+1}$ and $K_{m+1}$, and input to UA3P. The processes described above are performed, and judgment regarding whether the difference between the calculated depths Z and actually measured depth values Z' for each height h from the optical axis is within a predetermined range is judged. These procedures are repeated until the difference between the calculated depths Z and actually measured depth values Z' for each height h from the optical axis is within a predetermined range. Note that here, the predetermined range is set to be 200 nm or less. In addition, a range from 0 to ⅕ the maximum lens outer diameter is set as the range of h.

The distances among surfaces are obtained by measurements using OptiSurf (by Trioptics), which is an apparatus for measuring the central thicknesses and distances between surfaces of paired lenses.

The refractive indices are obtained by performing measurements in a state in which the temperature of a measurement target is 25° C. using KPR-2000 (by K. K. Shimadzu), which is a precision refractometer. The refractive index measured with respect to the d line (wavelength: 587.6 nm) is designated as Nd. Similarly, the refractive index measured with respect to the e line (wavelength: 546.1 nm) is designated as Ne, the refractive index measured with respect to the F line (wavelength: 486.1 nm) is designated as NF, the refractive index measured with respect to the C line (wavelength: 656.3 nm) is designated as NC, and the refractive index measured with respect to the g line (wavelength: 435.8 nm) is designated as Ng. The Abbe's number vd with respect to the d line is obtained by calculations, substituting the values of Nd, NF, and NC obtained by the above measurements into the formula below.

$$vd=(Nd-1)/(NF-NC)$$

What is claimed is:

1. An imaging lens substantially consisting of five lenses, including:
a first lens having a positive refractive power and a convex surface toward the object side;
a second lens having a negative refractive power and is of a meniscus shape with a concave surface toward the object side;
a third lens having a positive refractive power and is of a meniscus shape with a convex surface toward the object side;
a fourth lens having a positive refractive power and is of a meniscus shape with a concave surface toward the object side; and
a fifth lens having a negative refractive power and is of an meniscus shape having a convex surface toward the object side, the surface thereof toward the image side being of an aspherical shape having at least one inflection point within a range from an intersection of a principal light ray at a maximum angle of view with the surface toward the image side inwardly toward the optical axis in the radial direction, provided in this order from the object side;
the imaging lens satisfying the following conditional formula:

$$1.29<f/f1<3 \tag{1}$$

wherein f is the focal length of the entire system, and f1 is the focal length of the first lens, and
the imaging lens satisfying the following conditional formula:

$$0<f/f3\leq0.17 \tag{3-2}$$

wherein f3 is the focal length of the third lens.

2. An imaging lens as defined in claim 1 that further satisfies the following conditional formula:

$$0<f/(f3\cdot vd3)<0.012 \tag{4}$$

wherein f3 is the focal length f of the third lens, and vd3 is the Abbe's number of the third lens with respect to the d line.

3. An imaging lens as defined in claim 1 that further satisfies the following conditional formula:

$$0.5<L1f/\Phi<0.86 \tag{5}$$

wherein L1f is the paraxial radius of curvature of the surface of the first lens toward the object side, and $\Phi$ is the diameter of the entrance pupil.

4. An imaging lens as defined in claim 1 that further satisfies the following conditional formula:

$$1<f\tan\omega/L5r<3 \tag{6}$$

wherein $\omega$ is the half value of a maximum angle of view when focused on an object at infinity, and L5r is the paraxial radius of curvature of the surface of the fifth lens toward the image side.

5. An imaging lens as defined in claim 1 that further satisfies the following conditional formula:

$$-1.6<f/f5<-1.22 \tag{7}$$

wherein f5 is the focal length of the fifth lens.

6. An imaging lens as defined in claim 1, wherein:
the first lens is of a biconvex shape.

7. An imaging lens as defined in claim 1, wherein:
the surface of the second lens toward the object side is of an aspherical shape having at least one inflection point within a range from an intersection of a marginal axial light ray with the surface toward the object side inwardly toward the optical axis in the radial direction.

8. An imaging lens as defined in claim 1, wherein:
the surface of the third lens toward the object side is of an aspherical shape having at least one inflection point within a range from an intersection of a marginal axial light ray with the surface toward the object side inwardly toward the optical axis in the radial direction.

9. An imaging lens as defined in claim 1, further comprising:
an aperture stop positioned at the object side of the surface of the first lens toward the object side.

10. An imaging lens as defined in claim 1 that further satisfies the following conditional formula:

$$1.32<f/f1<2.5 \tag{1-1}$$

wherein f1 is the focal length of the first lens.

11. An imaging lens as defined in claim 1 that further satisfies the following conditional formula:

$$1.34<TTL/(f\tan\cdot\omega)<1.45 \tag{2-1}$$

wherein TTL is the distance from the surface of the first lens toward the object side to the imaging surface along the optical axis in the case that back focus is an air converted length, and co is the half value of a maximum angle of view when focused on an object at infinity.

12. An imaging lens as defined in claim 1 that further satisfies the following conditional formula:

$$0<f/(f3\cdot vd3)<0.004 \tag{4-1}$$

wherein f3 is the focal length of the third lens, and vd3 is the Abbe's number of the third lens with respect to the d line.

13. An imaging lens as defined in claim 1 that further satisfies the following conditional formula:

$$0.6<L1f/\Phi<0.84 \tag{5-1}$$

wherein L1f is the paraxial radius of curvature of the surface of the first lens toward the object side, and $\Phi$ is the diameter of the entrance pupil.

14. An imaging lens as defined in claim 1 that further satisfies the following conditional formula:

$$1.35<f/f1<2 \tag{1-2}$$

wherein f1 is the focal length of the first lens.

15. An imaging lens as defined in claim 1 that further satisfies the following conditional formula:

$$1.38<TTL/(f\tan\cdot\omega)<1.45 \tag{2-2}$$

wherein TTL is the distance from the surface of the first lens toward the object side to the imaging surface along the optical axis in the case that back focus is an air converted length, and ω is the half value of a maximum angle of view when focused on an object at infinity.

16. An imaging apparatus comprising the imaging lens as defined in claim 1.

17. An imaging lens substantially consisting of five lenses, including:
- a first lens having a positive refractive power and a convex surface toward the object side;
- a second lens having a negative refractive power and is of a meniscus shape with a concave surface toward the object side;
- a third lens having a positive refractive power and is of a meniscus shape with a convex surface toward the object side;
- a fourth lens having a positive refractive power and is of a meniscus shape with a concave surface toward the object side; and
- a fifth lens having a negative refractive power and a concave surface toward the image side, the surface thereof toward the image side being of an aspherical shape having at least one inflection point within a range from an intersection of a principal light ray at a maximum angle of view with the surface toward the image side inwardly toward the optical axis in the radial direction, provided in this order from the object side;

the imaging lens satisfying the following conditional formula:

$$1.26 < TTL/(f\tan \omega) < 1.46 \tag{2}$$

wherein TTL is the distance from the surface of the first lens toward the object side to the imaging surface along the optical axis in the case that back focus is an air converted length, f is the focal length of the entire system, and ω is the half value of a maximum angle of view when focused on an object at infinity, and the imaging lens satisfying the following conditional formula:

$$0 < f/f3 \le 0.17 \tag{3-2}$$

wherein f3 is the focal length of the third lens.

18. An imaging lens as defined in claim 17 that further satisfies the following conditional formula:

$$1.29 < f/f1 < 3 \tag{1}$$

wherein f1 is the focal length of the first lens.

* * * * *